United States Patent
Yoshida

(10) Patent No.: US 11,416,185 B2
(45) Date of Patent: Aug. 16, 2022

(54) IMAGE PROCESSING DEVICE, PRINTING APPARATUS, IMAGE PROCESSING METHOD WITH CONTROL FOR PRINT MEDIUM FEED EXECUTED AT FIRST TIME INTERVAL WHERE ERROR MODULE IS DETECTED AND AT SECOND TIME INTERVAL WHERE ERROR MODULE IS NOT DETECTED

(71) Applicant: CANON KABUSHIKI KAISHA, Tokyo (JP)

(72) Inventor: Teruyuki Yoshida, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 16/922,105

(22) Filed: Jul. 7, 2020

(65) Prior Publication Data
US 2021/0042067 A1    Feb. 11, 2021

(30) Foreign Application Priority Data
Aug. 9, 2019   (JP) .............................. JP2019-147566

(51) Int. Cl.
  *G06F 3/12* (2006.01)
  *B41J 29/393* (2006.01)
(52) U.S. Cl.
  CPC .......... *G06F 3/1215* (2013.01); *B41J 29/393* (2013.01); *G06F 3/121* (2013.01); *G06F 3/1279* (2013.01)
(58) Field of Classification Search
  None
  See application file for complete search history.

(56) References Cited

U.S. PATENT DOCUMENTS

| 4,805,013 | A | | 2/1989 | Dei et al. |
| 5,086,487 | A | | 2/1992 | Katayama et al. |
| 5,138,672 | A | * | 8/1992 | Hirabayashi .......... G06T 3/4023 |
| | | | | 382/298 |
| 5,159,468 | A | | 10/1992 | Yoshida et al. |
| 5,638,192 | A | | 6/1997 | Yoshida |
| 5,734,760 | A | | 3/1998 | Yoshida |
| 5,774,231 | A | | 6/1998 | Yoshida |

(Continued)

FOREIGN PATENT DOCUMENTS

JP    2005-323159 A    11/2005

*Primary Examiner* — Miya J Williams
*Assistant Examiner* — Pawan Dhingra
(74) *Attorney, Agent, or Firm* — Venable LLP

(57) ABSTRACT

An image processing device of the present invention comprises: image processing groups each of which includes modules that perform predetermined image processing on pieces of divided image data obtained by dividing input image data and each of which outputs the pieces of image data processed in the respective modules via a predetermined one of the modules; an obtaining unit to which the image processing groups are connected in parallel and which obtains the pieces of image data processed and outputted from the image processing groups; a detection unit which detects an error module not performing normal processing among the modules; and a control unit which sets a usable group that is usable for the image processing among the image processing groups based on a result detected by the detection unit and which causes the usable group to execute the image processing on the pieces of divided image data.

18 Claims, 22 Drawing Sheets

(56) References Cited

U.S. PATENT DOCUMENTS

| | | | |
|---|---|---|---|
| 5,898,764 A * | 4/1999 | Yoshida | H04N 1/33361 |
| | | | 379/28 |
| 5,943,449 A | 8/1999 | Yoshida | |
| 5,956,425 A | 9/1999 | Yoshida | |
| 6,008,913 A | 12/1999 | Yoshida | |
| 6,178,005 B1 | 1/2001 | Yoshida | |
| 6,266,128 B1 | 7/2001 | Yoshida et al. | |
| 6,285,465 B1 | 9/2001 | Yoshida | |
| 6,335,746 B1 | 1/2002 | Enokida et al. | |
| 6,369,915 B1 | 4/2002 | Yoshida | |
| 6,545,747 B2 | 4/2003 | Yoshida et al. | |
| 6,724,494 B1 * | 4/2004 | Danknick | G06F 3/1285 |
| | | | 358/1.14 |
| 6,982,805 B2 | 1/2006 | Yoshida | |
| 2002/0118383 A1 * | 8/2002 | Kamiya | H04N 1/0048 |
| | | | 358/1.14 |
| 2005/0248584 A1 * | 11/2005 | Takeo | G06F 13/4027 |
| | | | 345/603 |
| 2010/0073708 A1 * | 3/2010 | Tajima | H04N 1/00225 |
| | | | 358/1.15 |
| 2010/0296128 A1 * | 11/2010 | Young | G03G 15/238 |
| | | | 358/409 |
| 2011/0026067 A1 * | 2/2011 | Hamaguchi | B65H 29/60 |
| | | | 358/1.14 |
| 2015/0378645 A1 * | 12/2015 | Kunieda | G06F 3/1206 |
| | | | 358/1.13 |

* cited by examiner

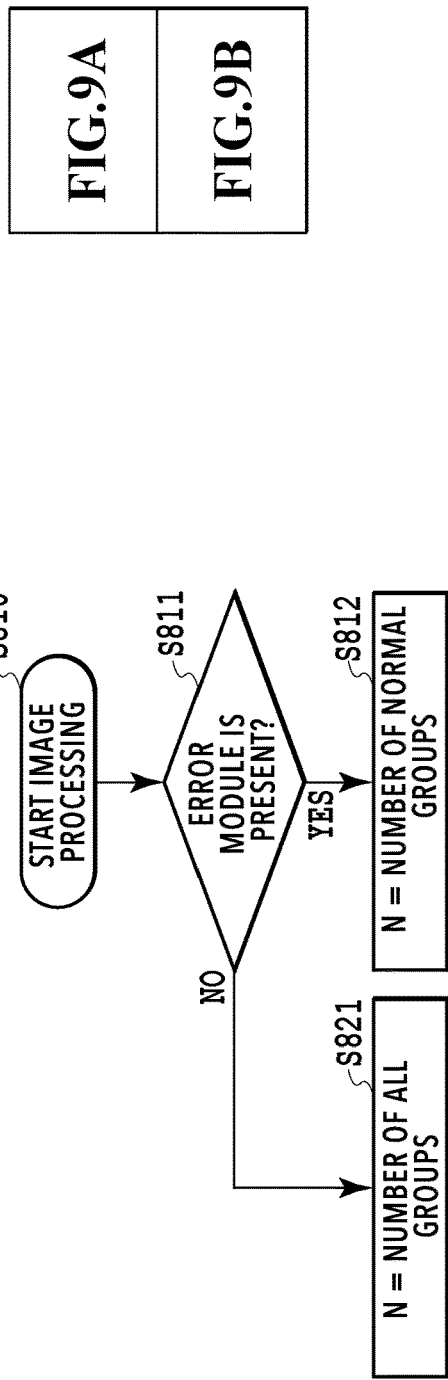

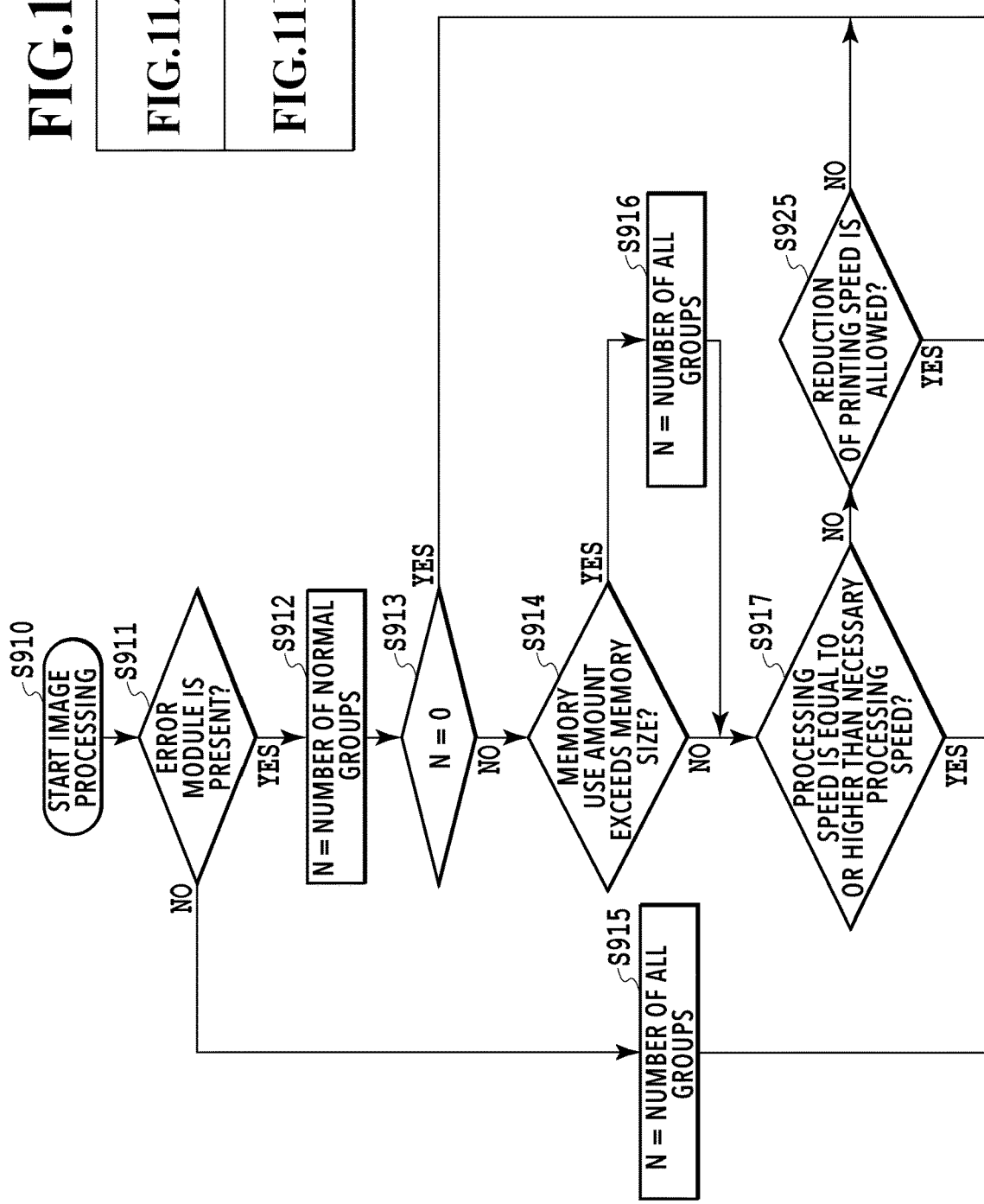

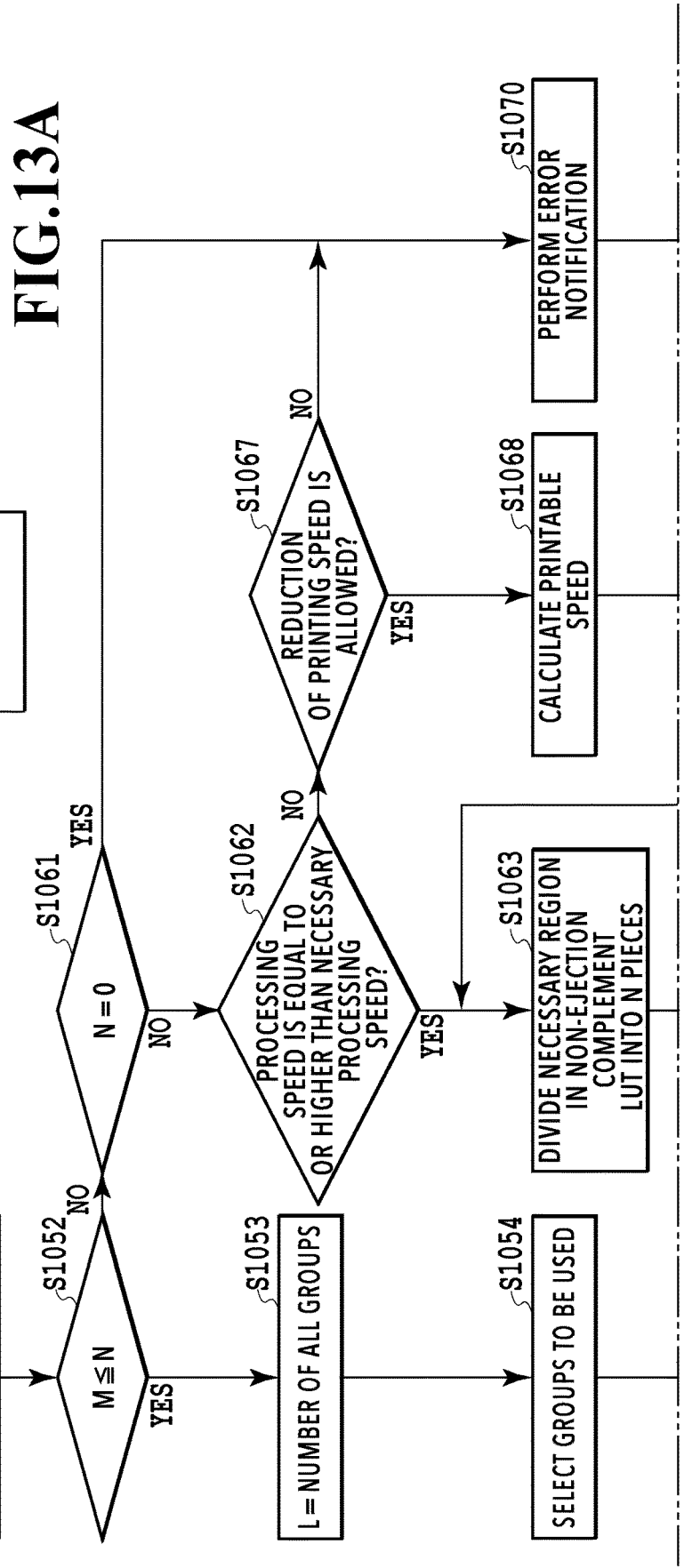

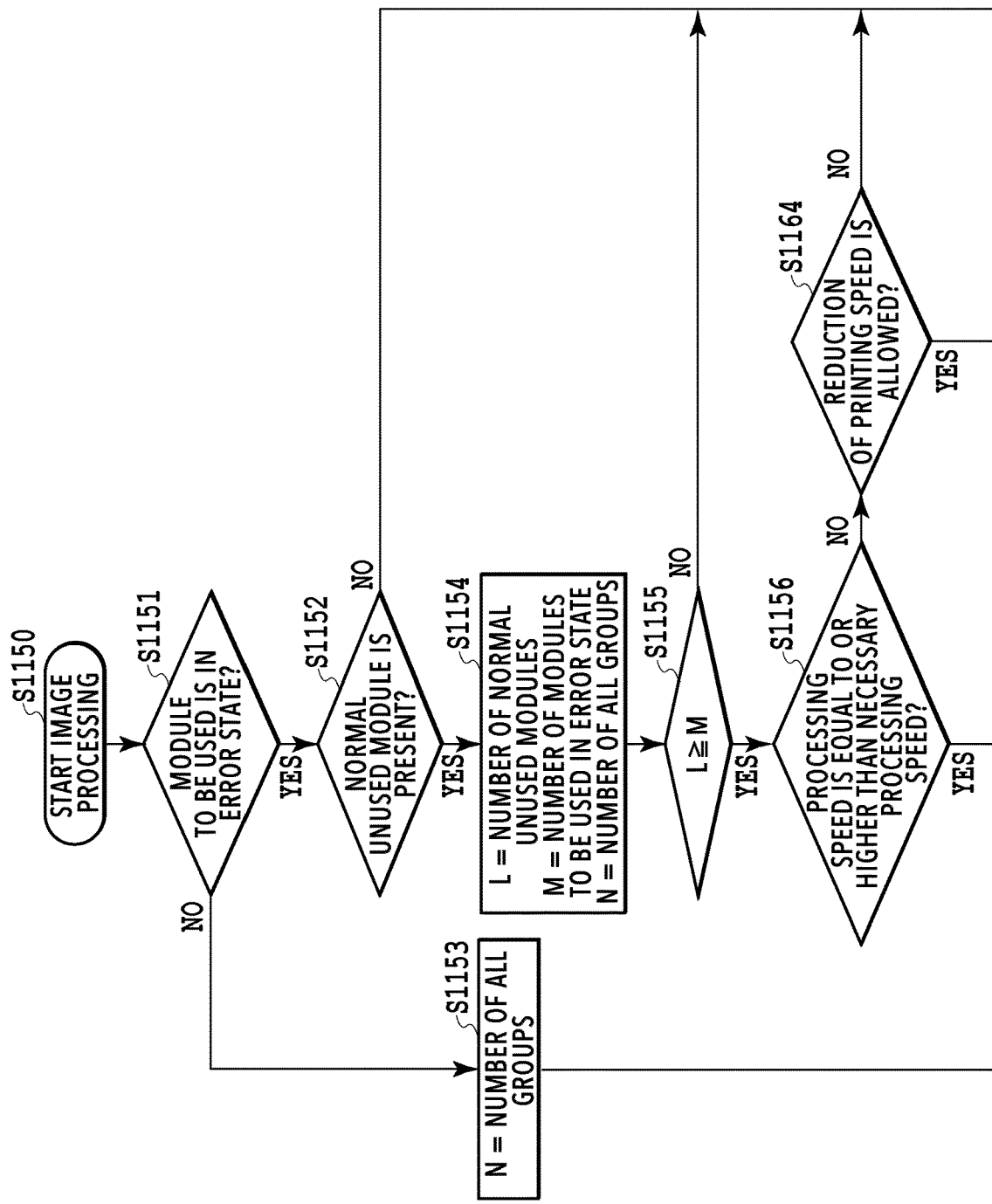

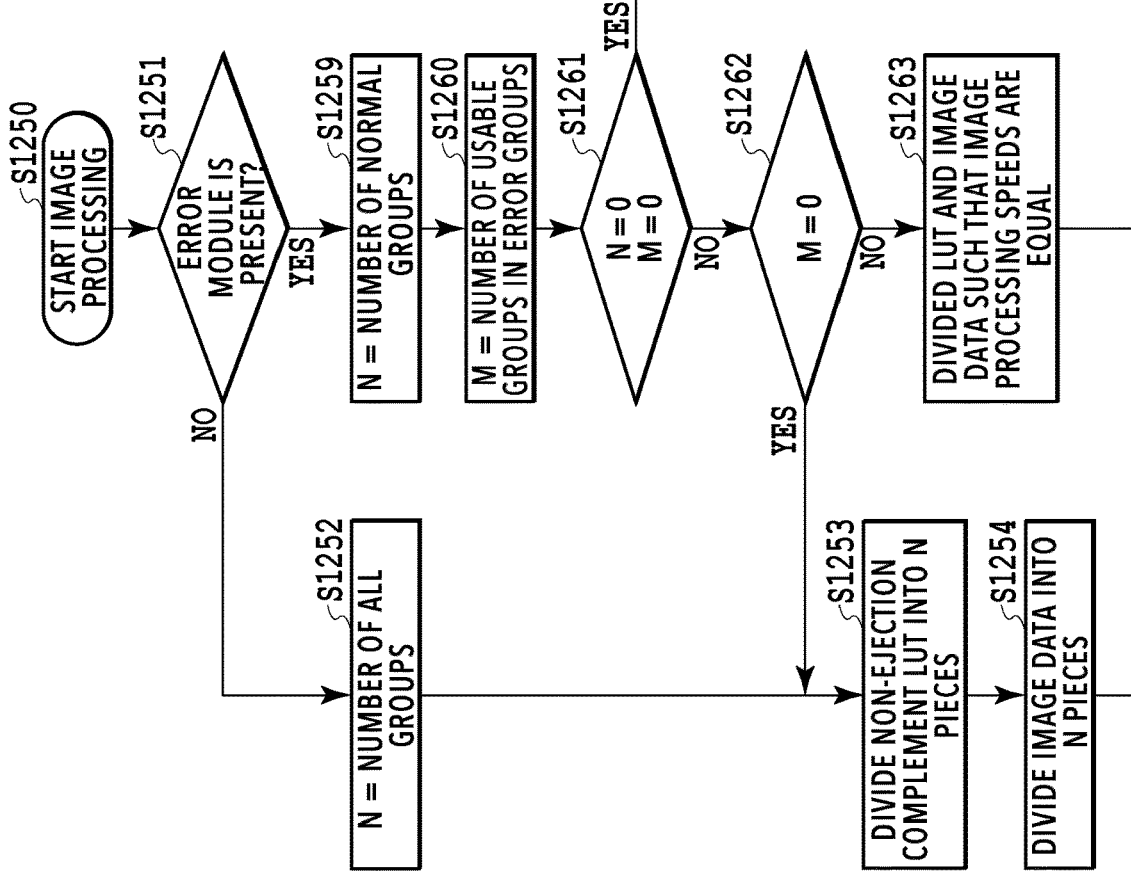

IMAGE PROCESSING DEVICE, PRINTING APPARATUS, IMAGE PROCESSING METHOD WITH CONTROL FOR PRINT MEDIUM FEED EXECUTED AT FIRST TIME INTERVAL WHERE ERROR MODULE IS DETECTED AND AT SECOND TIME INTERVAL WHERE ERROR MODULE IS NOT DETECTED

BACKGROUND OF THE INVENTION

Field of the Invention

The present invention relates to an image processing device, a printing apparatus, and an image processing method by using multiple image processing modules.

Description of the Related Art

As a method of increasing speed of image processing, a method of distributed processing in which multiple processing units are connected in series or parallel has been conventionally known. Japanese Patent Laid-Open No. 2005-323159 discloses a technique in which multiple image processing modules having the same functions are connected to an image data obtaining unit such as a PCIe switch and the image processing modules process image data in parallel to improve processing performances of image processing.

SUMMARY OF THE INVENTION

The method of Japanese Patent Laid-Open No. 2005-323159 has such a problem that the entire processing stops in the case where an error occurs in even one of the image processing modules.

An object of the present invention is to provide an image processing technique that allows image processing to continue even if an error occurs in multiple modules.

The present invention is an image processing device that performs image processing to generate image data to be supplied to a printing apparatus and comprises: a plurality of image processing groups each of which includes a plurality of modules that perform predetermined image processing on pieces of divided image data obtained by dividing input image data and each of which outputs the pieces of image data processed in the respective modules via a predetermined one of the modules; an obtaining unit to which the plurality of image processing groups are connected in parallel and which obtains the pieces of image data processed and outputted from the image processing groups; a detection unit which detects an error module not performing normal processing among the plurality of modules; and a control unit which sets a usable group that is usable for the image processing among the plurality of image processing groups based on a result detected by the detection unit and which causes the usable group to execute the image processing on the pieces of divided image data.

The present invention allows image processing to continue even if an error occurs in multiple modules.

Further features of the present invention will become apparent from the following description of exemplary embodiments with reference to the attached drawings.

BRIEF DESCRIPTION OF THE DRAWINGS

FIG. 9 is a diagram showing a relationship between FIG. 9A and FIG. 9B;
FIGS. 9A and 9B are flowcharts illustrating steps of image processing in a first embodiment;
FIG. 11 is a diagram showing a relationship between FIG. 11A and FIG. 11B;
FIGS. 11A and 11B are flowcharts illustrating steps of image processing in a second embodiment;
FIG. 13 is a diagram showing a relationship between FIG. 13A and FIG. 13B;
FIGS. 13A and 13B are flowcharts illustrating steps of image processing in a third embodiment;
FIG. 15 a diagram showing a relationship between FIG. 15A and FIG. 15B;
FIGS. 15A and 15B are flowcharts illustrating steps of image processing in a fourth embodiment;
FIG. 17 is a diagram showing a relationship between FIG. 17A and FIG. 17B;
and
FIGS. 17A and 17B are flowcharts illustrating steps of image processing in a fifth embodiment.

DESCRIPTION OF THE EMBODIMENTS

Figure 1:
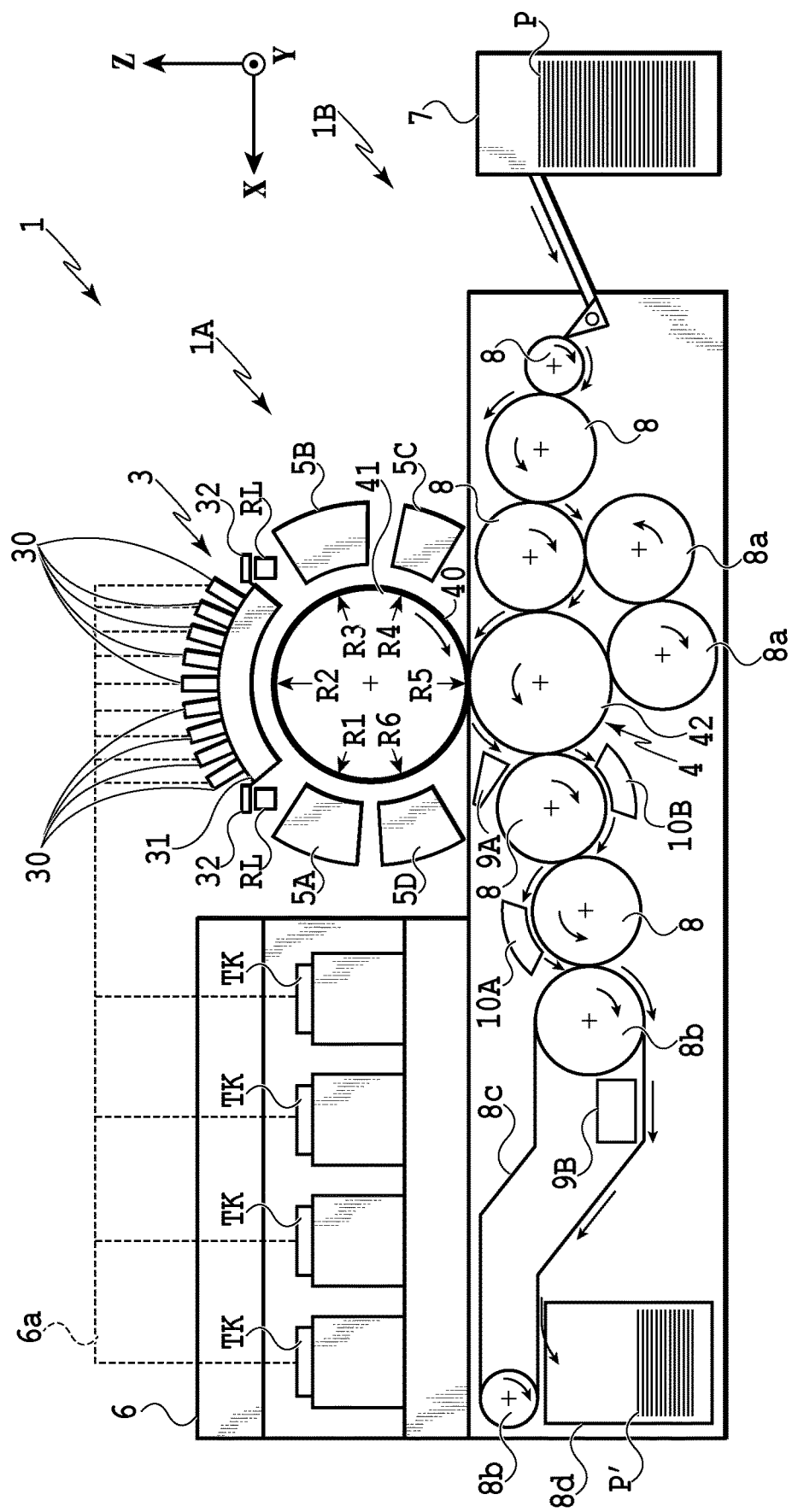
FIG. 1 is a schematic diagram of a printing apparatus.

Embodiments of the present invention are described with reference to the drawings. Note that, in the drawings, the same parts are denoted by the same reference numerals.
[Printing Apparatus]
FIG. 1 is a front diagram schematically illustrating a printing apparatus 1 according to one embodiment of the present invention. The printing apparatus 1 in the embodiment is formed of a sheet-fed inkjet printer that produces printed matters P' by transferring ink images onto print media P via a transfer body 40. The printing apparatus 1 includes an image forming unit 1A and a conveying unit 1B. In the embodiment, an X direction, a Y direction, and a Z direction are a length direction (overall length direction), a width direction, and a height direction of the printing apparatus 1. The print media P are conveyed in the X direction.

In this specification, "print" not only includes formation of information with meanings such as characters and figures but also widely includes formation of images, designs, patterns, and the like on the print media regardless of whether they have meanings or not and also includes processing of the media. Accordingly, "print" does not matter whether a "printed" object is visible such that a human can visually recognize it or not. Moreover, the "print media" in the embodiment are assumed to be paper sheets. Accordingly, in the following description, feeding of the print media is also referred to as "sheet feeding." Moreover, the print media may be made of cloth, plastic film, or the like instead of paper. Although components of inks are not limited to particular components, in the embodiment, aqueous pigment inks including water, resins, and pigments that are color materials are assumed to be used.

(Image Forming Unit)

The image forming unit 1A includes a printing unit 3, a transferring unit 4, peripheral units 5A to 5D, and a supplying unit 6.

<Printing Unit>

Figure 2:
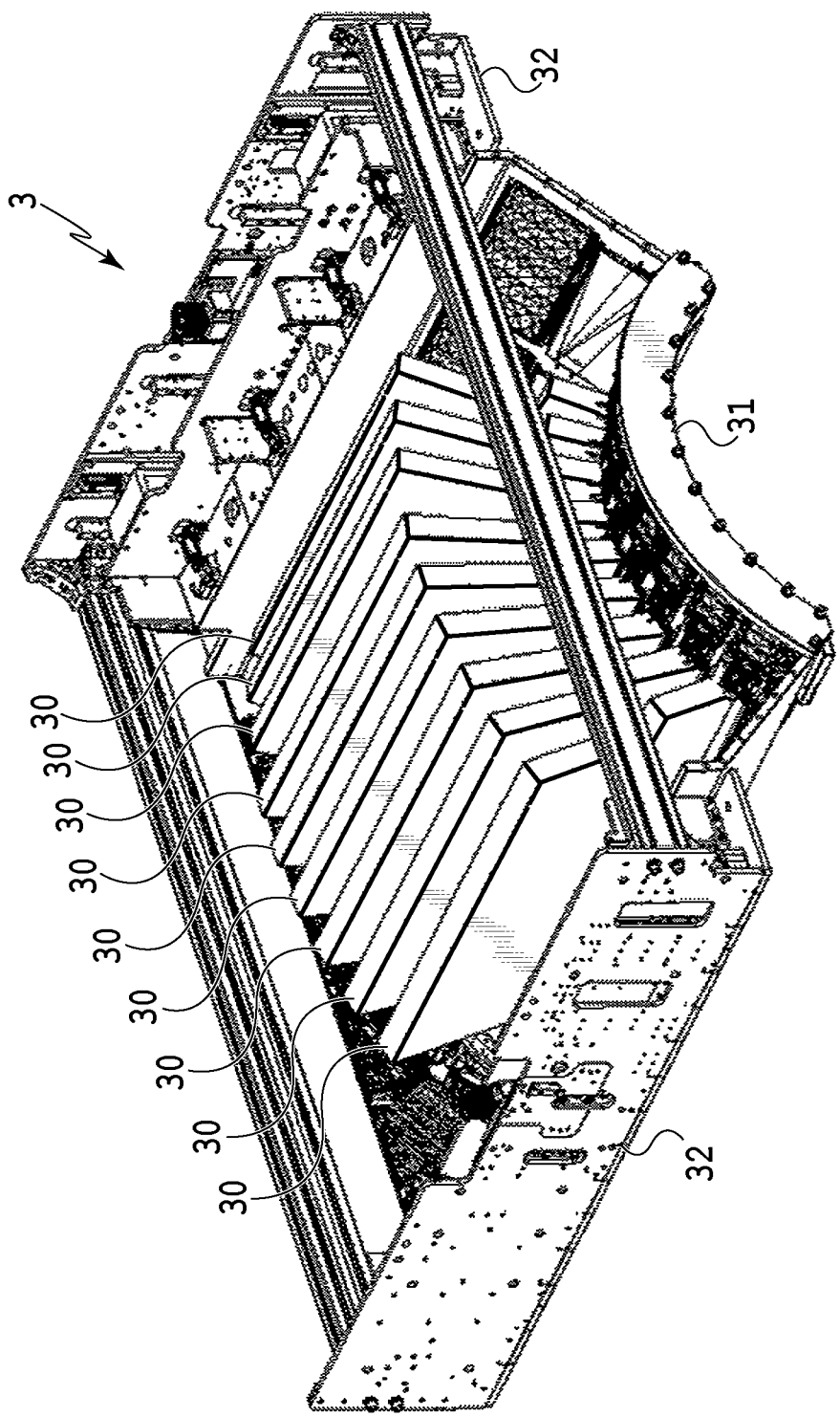
FIG. 2 is a perspective view of a printing unit.

As illustrated in FIGS. 1 and 2, the printing unit (printing means) 3 includes multiple print heads 30 and a carriage 31. FIG. 2 is a perspective view of the printing unit 3. The print heads 30 eject liquid inks to the transfer body 40 and form ink images on the transfer body 40 as printed images.

In this embodiment, each print head 30 is a full-line head extending in the Y direction and ejection ports are arranged in a range covering the width of an image print region in a print medium of a maximum usable size. A lower surface of the print head 30 includes an ejection surface where the ejection ports are formed. The ejection surface faces a surface of the transfer body 40 with a fine gap (for example, several mm) provided therebetween. In the embodiment, the transfer body 40 has such a configuration that the transfer body 40 circulates in a circular orbit. Accordingly, the multiple print heads 30 are arranged along lines radiating from the center of the transfer body 40.

An ejection energy generating element (hereafter, also referred to as ejection element) for ejecting the ink is provided in each ejection port. The ejection element is, for example, an element that ejects the ink in the ejection port by generating pressure in the ejection port. Examples of the ejection element include an element that ejects the ink by causing film boiling and generating air bubbles in the ink with, for example, an electrothermal convertor (heater), an element that ejects the ink with a piezoelectric convertor, an element that ejects the ink by using static electricity, and the like. From viewpoint of high-speed, high-density printing, it is effective to use the ejection element using the electrothermal convertor.

In this embodiment, nine print heads 30 are provided. The print heads 30 eject different types of inks, respectively. The different types of inks are, for example, inks with different color materials and are inks such as a yellow ink, a magenta ink, a cyan ink, a black ink, and the like. The configuration may be such that one print head 30 ejects one type of ink or one print head 30 ejects multiple types of inks. In the case where multiple print heads 30 are provided as described above, some of the print heads 30 may eject an ink that includes no color material (for example, image quality improvement liquid).

The carriage 31 supports the multiple print heads 30. An end portion of each print head 30 on the ejection surface side is fixed to the carriage 31. The gap between the ejection surface and the surface of the transfer body 40 can be thereby more accurately maintained. The carriage 31 is configured to be movable with the print heads 30 mounted thereon by being guided by guide members RL. In the embodiment, the guide members RL are rail members extending in the Y direction and are provided in a pair to be spaced away from each other in the X direction. Slide portions 32 are provided in the respective side portions of the carriage 31 in the X direction. The slide portions 32 engage with the guide members RL and slide in the Y direction along the guide members RL.

<Transferring Unit>

The transferring unit 4 is described with reference to FIG. 1. The transferring unit 4 includes a transfer cylinder 41 and an impression cylinder 42. These cylinders are rotating bodies that rotate about rotation axes extending in the Y direction and have cylindrical outer peripheral surfaces. In FIG. 1, arc-shaped arrows illustrated inside the transfer cylinder 41 and the impression cylinder 42 indicate the rotating directions of these cylinders and the transfer cylinder 41 rotates clockwise while the impression cylinder 42 rotates counterclockwise.

The transfer cylinder 41 is a supporting body that supports the transfer body 40 on its outer peripheral surface. The transfer body 40 is provided on the outer peripheral surface of the transfer cylinder 41, continuously or intermittently in a circumferential direction. In the case where the transfer body 40 is provided continuously, the transfer body 40 is formed in an endless belt shape. In the case where the transfer body 40 is provided intermittently, the transfer body 40 is formed while being divided into multiple segments formed in belt shapes with ends. The segments can be arranged in arc-shapes at even pitch on the outer peripheral surface of the transfer cylinder 41.

Rotation of the transfer cylinder 41 causes the transfer body 40 to circulate along the circular orbit. The positions of the transfer body 40 can be classified into a pre-ejection processing region R1, an ejection region R2, post-ejection processing regions R3 and R4, a transfer region R5, and a post-transfer processing region R6 depending on the rotation phase of the transfer cylinder 41. The transfer body 40 passes through these regions in a circulating manner.

The pre-ejection processing region R1 is a region in which pre-processing is performed on the transfer body 40 before the ejection of the inks by the printing unit 3 and is a region in which the peripheral unit 5A performs processing. In the embodiment, a reaction liquid for improving image quality is applied. The ejection region R2 is a region in which the printing unit 3 forms the ink images by ejecting the inks to the transfer body 40. The post-ejection processing regions R3 and R4 are processing regions in which processing on the ink images is performed after the ejection of the inks. The post-ejection processing region R3 is a region in which the peripheral unit 5B performs processing and the post-ejection processing region R4 is a region in which the peripheral unit 5C is performs processing. The transfer region R5 is a region in which the transferring unit 4 transfers the ink images on the transfer body 40 to each print medium P. The post-transfer processing region R6 is a region in which post processing is performed on the transfer body 40 after the transfer and is a region in which the peripheral unit 5D performs processing.

An outer peripheral surface of the impression cylinder 42 is brought into pressure contact with the transfer body 40. At least one grip mechanism that holds an end portion of the print medium P is provided on the outer peripheral surface of the impression cylinder 42. Multiple grip mechanisms may be provided while being spaced away from one another in a circumferential direction of the impression cylinder 42. The print medium P is conveyed while being brought into tight contact with the outer peripheral surface of the impression cylinder 42 and the ink images on the transfer body 40 are transferred in the case where the print medium P passes a nip portion between the impression cylinder 42 and the transfer body 40.

<Peripheral Units>

The peripheral units 5A to 5D are arranged in a periphery of the transfer body 40. In the embodiment, the peripheral units 5A to 5D are an applying unit, an absorbing unit, a heating unit, and a cleaning unit, respectively.

The applying unit 5A is a mechanism that applies the reaction liquid onto the transfer body 40 before the ejection of the ink by the printing unit 3. The reaction liquid is a liquid containing components that increase the viscosities of the inks. The absorbing unit 5B is a mechanism that absorbs liquid components from the ink images on the transfer body 40 before the transfer. Reducing the liquid components in the ink images can suppress bleed and the like in the image printed on the print medium P. The absorbing unit 5B includes, for example, a liquid absorbing member that reduces the amount of the liquid components in the ink images by coming into contact with the ink images.

The heating unit 5C is a mechanism that heats the ink images on the transfer body 40 before the transfer. Heating the ink images causes resins in the ink images to melt and improves the transferability to the print medium P. The cleaning unit 5D is a mechanism that cleans the surface of the transfer body 40 after the transfer. The cleaning unit 5D removes the inks remaining on the transfer body 40 and dust and the like on the transfer body 40.

<Supplying Unit>

The supplying unit 6 is a mechanism that supplies the ink to the print heads 30 of the printing unit 3. The supplying unit 6 includes storage portions TK that store the inks. The storage portions TK may be formed of main tanks and sub tanks. The storage portions TK and the print heads 30 communicate with one another via flow passages 6a and the inks are supplied from the storage portions TK to the print heads 30. The flow passages 6a may be flow passages that circulate the inks between the storage portions TK and the print heads 30 and the supplying unit 6 may include pumps and the like that circulate the inks.

<Conveying Unit>

The conveying unit 1B feeds the print media P stacked in a stacking portion to the transferring unit 4. The ink images are transferred (that is, printed) onto the print media P fed to the transferring unit 4. Thereafter, the conveying unit 1B discharges the printed matters P' on which the ink images are transferred, from the transferring unit 4. The conveying unit 1B includes a feeding unit (feeding means) 7, multiple conveyance cylinders 8, 8a, two sprockets 8b, a chain 8c, and a collection unit 8d. In FIG. 1, arc-shaped arrows illustrated inside the later-described conveyance cylinders 8, 8a in the conveying unit 1B indicate the rotating directions of the conveyance cylinders 8, 8a and arrows outside the cylinders indicate conveyance routes of the print media P and the printed matters P'. The print media P are conveyed from the feeding unit 7 to the transferring unit 4 and the printed matters P' are conveyed from the transferring unit 4 to the collection unit 8d. The feeding unit 7 side is referred to as the upstream side in the conveyance direction and the collection unit 8d side is referred to as the downstream side in some cases.

The feeding unit 7 includes the stacking portion in which multiple print media P are stacked and a feeding mechanism that feeds the print media P one by one from the stacking portion to the most-upstream conveyance cylinder 8. Each of the conveyance cylinders 8, 8a is a rotating body that rotates about a rotation axis extending in the Y direction and has a cylindrical outer peripheral surface. At least one grip mechanism that holds the end portion of each print medium P (or printed matter P') is provided on the outer peripheral surface of each of the conveyance cylinders 8, 8a. Grip operations and release operations of the grip mechanisms are controlled such that the print medium P is passed from one conveyance cylinder to another conveyance cylinder that are adjacent to each other.

The two conveyance cylinders 8a are conveyance cylinders for reversing the print media P. In the case of performing duplex printing on the print media P, each print medium P is passed from the impression cylinder 42 not to the adjacent conveyance cylinder 8 on the downstream side but to the conveyance cylinders 8a after the transfer onto the front side. The print medium P is turned over by traveling through a route on the two conveyance cylinders 8a and is passed to the impression cylinder 42 again via the conveyance cylinder 8 upstream of the impression cylinder 42. The back side of the print medium P thereby faces the transfer cylinder 41 and the ink images are transferred onto the back side.

The chain 8c is wound around the two sprockets 8b. One of the two sprockets 8b is a drive sprocket and the other sprocket is a driven sprocket. The chain 8c circulates by rotation of the drive sprocket. The chain 8c is provided with multiple grip mechanisms spaced away from one another in a longitudinal direction of the chain 8c. Each grip mechanism grips the end portion of the printed matter F. The printed matter P' is passed from the conveyance cylinder 8 located at a downstream end to one of the grip mechanisms of the chain 8c. The printed matter P' gripped by the grip mechanism is conveyed to the collection unit 8d by traveling of the chain 8c and the gripping is released. The printed matter P' is thereby stacked in the collection unit 8d.

<Post-Processing Unit>

The conveying unit 1B is provided with post-processing units 10A, 10B. The post-processing units 10A, 10B are arranged downstream of the transferring unit 4 and are mechanisms that perform post-processing on the printed matters P'. The post-processing unit 10A performs processing on the front sides of the printed matters P' and the post-processing unit 10B performs processing on the back sides of the printed matters P'.

<Checking Unit>

The conveying unit 1B is provided with checking units 9A, 9B. The checking units 9A, 9B are arranged downstream of the transferring unit 4 and are mechanisms that check the printed matters P'. In the embodiment, the checking unit 9A is an image capturing device that captures an image printed on each printed matter P' and includes, for example, an image capturing element such as a CCD sensor or a CMOS sensor. The checking unit 9A captures the printed image during the printing operation performed continuously. It is possible to check changes in tint of the printed image and the like and determine whether to correct image data or print data, based on the image captured by the checking unit 9A. In the embodiment, an image capturing range of the checking unit 9A is set to the outer peripheral surface of the impression cylinder 42 and the checking unit 9A is arranged to be capable of partially capturing the printed image just after the transfer. The checking unit 9A may check all printed images or check every predetermined number of printed images.

In the embodiment, the checking unit 9B is also an image capturing device that captures the image printed on each printed matter P' and includes, for example, an image capturing element such as a CCD sensor or a CMOS sensor. The checking unit 9B captures the printed image in a test printing operation. The checking unit 9B can capture the entire printed image and it is possible to perform various basic settings for correction relating to the print data based on the image captured by the checking unit 9B. In the embodiment, the checking unit 9B is arranged at a position where the image of the printed matter P' conveyed by the chain 8c can be captured. In the case where the checking unit 9B captures the printed image, the traveling of the chain 8c is temporarily stopped and the entire printed image is captured. The checking unit 9B may be a scanner that scans the printed matter P'.

<Control Unit>

Figure 3:
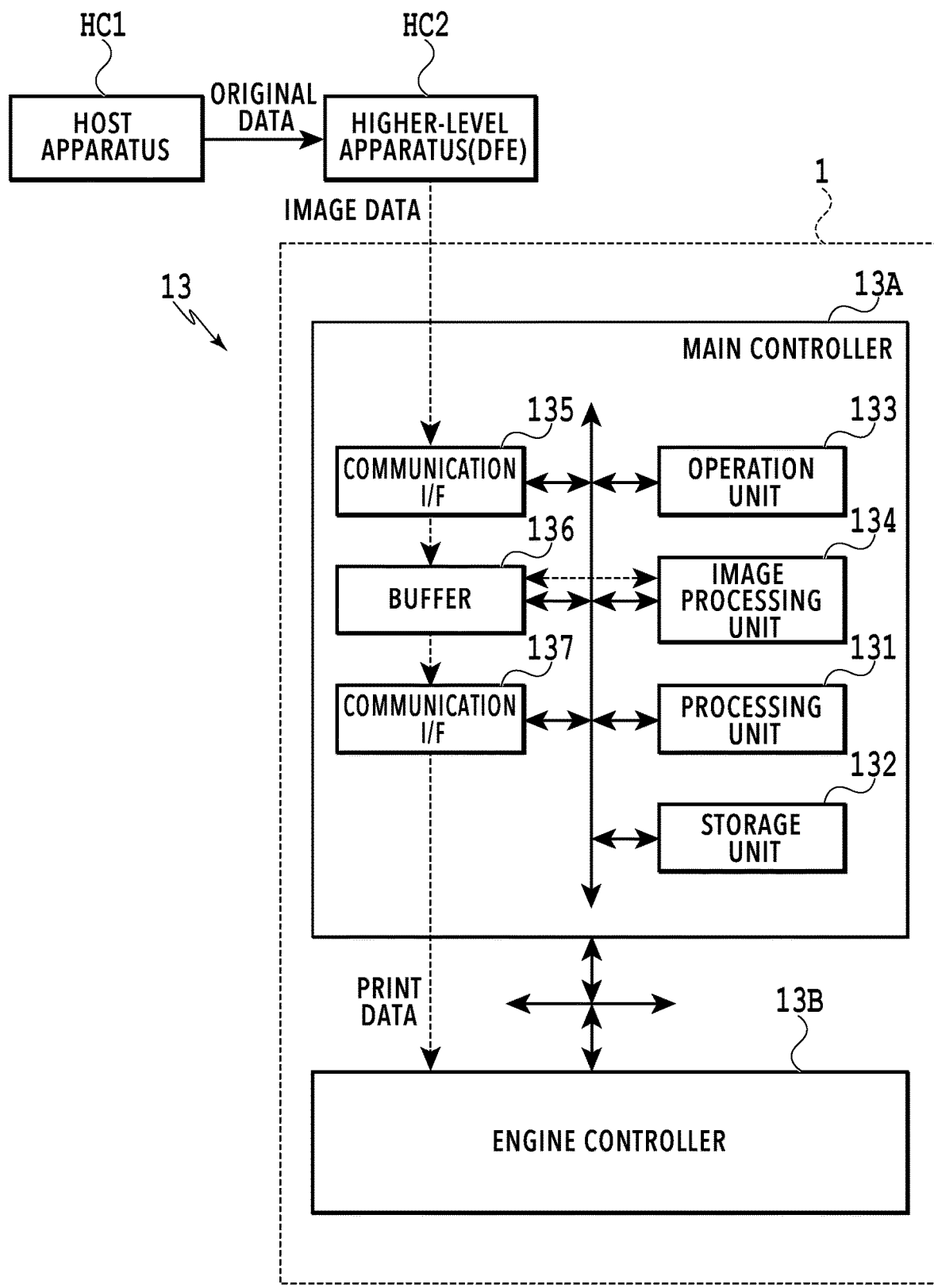
FIG. 3 is a block diagram illustrating a configuration of a control system of the printing apparatus.

Next, a control unit 13 of the printing apparatus 1 is described. FIG. 3 is a block diagram illustrating a hardware configuration of the control unit 13 of the printing apparatus 1. The control unit 13 is communicably connected to a higher-level apparatus (digital front end processor (DFE)) HC2. Moreover, the higher-level apparatus HC2 is communicably connected to a host apparatus HC1.

Original data being the source of the printed image is generated or stored in the host apparatus HC1. The original data in this case is generated, for example, in an electronic file format of a document film, an image file, or the like. This original data is transmitted to the higher-level apparatus HC2 and the higher-level apparatus HC2 converts the received original data to a data format usable in the control unit 13 (for example, RGB data expressing an image in RGB). The converted data is transmitted from the higher-level apparatus HC2 to the control unit 13 as the image data. The control unit 13 starts the printing operation based on the received image data.

In the embodiment, the control unit 13 is roughly divided into a main controller 13A and an engine controller 13B. The main controller 13A includes a processing unit 131, a storage unit 132, an operation unit 133, an image processing unit 134, a communication interface (I/F) 135, a buffer 136, and a communication I/F 137. Note that the control unit 13 performs a function as a print controlling unit that controls the printing operation of the printing apparatus in the embodiment. Moreover, the processing unit 131 and the storage unit 132 form a computer for controlling the units of the printing apparatus 1.

The processing unit 131 is a processor such as a CPU. The processing unit 131 executes programs stored in the storage unit 132 and controls the entire main controller 13A. The storage unit 132 is a storage device such as a RAM, a ROM, a hard disk, and a SSD. Data and programs to be executed by the CPU are stored in the storage unit 132. Moreover, the storage unit 132 provides a work area used in the case where the CPU executes processing. The operation unit 133 is, for example, an input device such as a touch panel, a keyboard, and a mouse and receives instructions of a user.

The image processing unit 134 is, for example, an electronic circuit including an image processing processor. The buffer 136 is formed of, for example, a RAM, a hard disk, or a SSD. The I/F 135 performs communication with the higher-level apparatus HC2 while the I/F 137 performs communication between the main controller 13A and the engine controller 13B.

Figure 4:
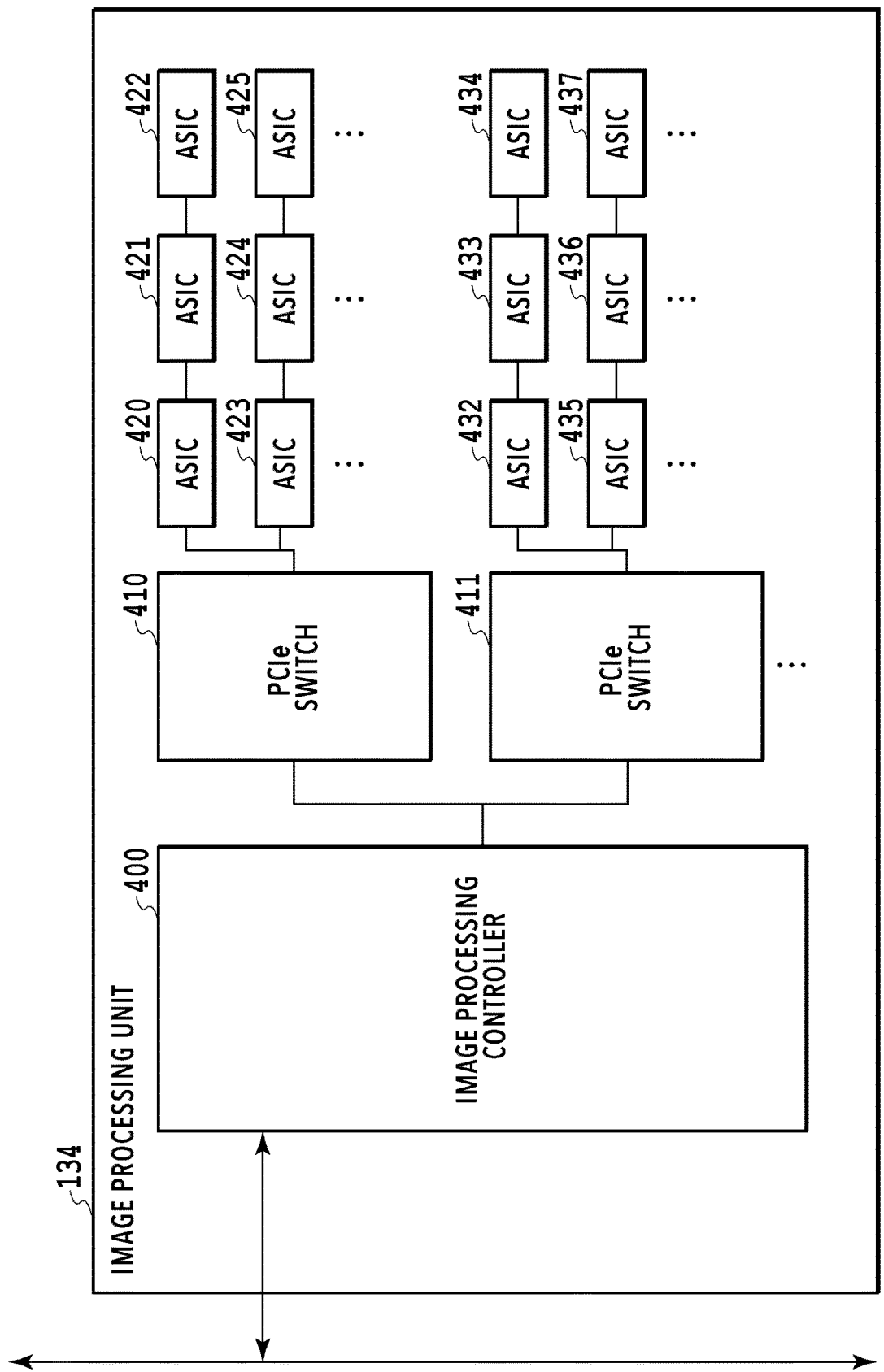
FIG. 4 is a block diagram illustrating a configuration of an image processing unit.

FIG. 4 is a block diagram illustrating a configuration of the image processing unit 134. The image processing unit 134 is formed of an image processing controller 400, a PCI express (registered trademark, hereafter also referred to as PCIe) switch 410, a PCIe switch 411, and multiple image processing modules (ASICs) 420 to 445 that perform image processing. The multiple ASICs that perform image processing are connected to the image processing controller 400 via the PCIe switches. In this example, in order to provide a large enough number of PCIe slots for the connection of the multiple ASICs, multiple (two in FIG. 4) PCIe switches 410, 411 are connected to the image processing controller 400. The image processing controller 400 has a function as a control unit that performs various types of calculation and control and also has a function as a calculation unit that calculates memory capacities in the ASICs to be described later and performs a function as a speed obtaining unit that calculates and obtains a printing speed or printable speed. Moreover, the image processing controller 400 and the PCIe switches 410, 411 form a transmission unit that transmits data to the ASICs and an obtaining unit that obtains data from the ASICs. Note that, although all communications in the image processing unit 134 are PCIe communications in the embodiment, the communications are not limited to this and other communication means may be used as long as it satisfies the performances of USB, LAN, and the like.

Figure 5:
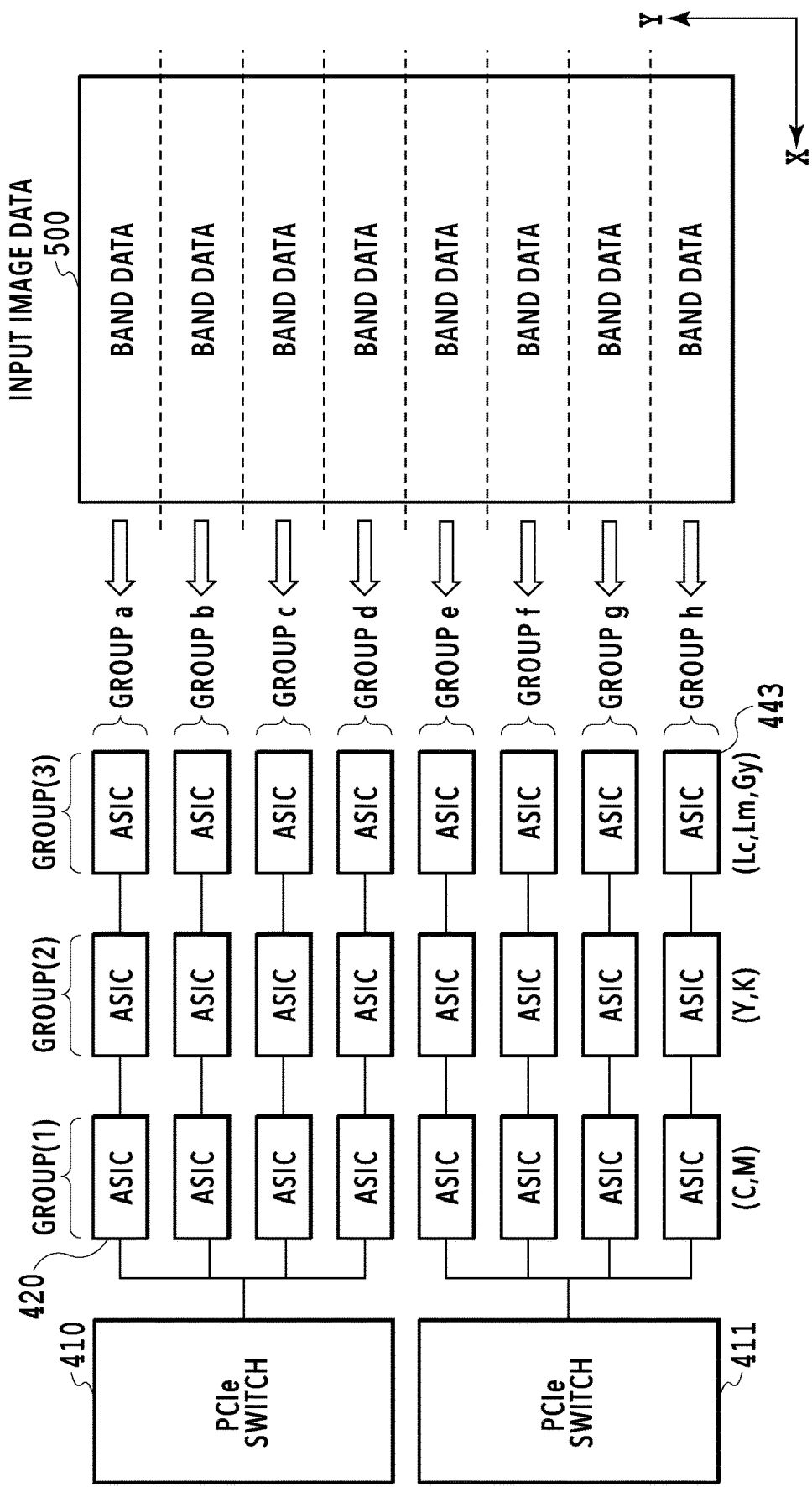
FIG. 5 is a diagram illustrating an example of connection states of ASICs and a group configuration of the ASICs.

Steps of the image processing executed by the multiple ASICs provided in the image processing unit 134 of the embodiment are described below. FIG. 5 is a diagram illustrating an example of connection states of the multiple ASICs and an ASIC group configuration consisting of the ASICs. In this example, there are provided eight image processing groups (hereafter, simply referred to as groups) a to h in each of which three ASICs are connected in series. In other words, total of 24 ASICs are provided. The four groups a to d among the eight groups a to h are connected to the PCIe switch 410 and the other four groups e to h are connected to the PCIe switch 411.

Moreover, the 24 ASICs are grouped into a group (1), a group (2), and a group (3) in the ascending order of the distance to the PCIe switches. Specifically, the eight ASICs each connected to the PCIe switch 410 or 411 form the group (1). Moreover, the eight ASICs connected to the ASICs in the group (1) form the group (2). Furthermore, the eight ASICs connected to the ASICs in the group (2) form the group (3). These three groups (1) to (3) process different pieces of color component data included in input image data, respectively.

Moreover, in this example, the input image data 500 is subjected to image processing in the 24 ASICs in a distributed manner. Specifically, an image to be formed is divided into eight regions (hereafter, also referred to as band regions) and the input image data 500 is divided into eight pieces of divided image data (hereafter, also referred to as band data) corresponding to the respective regions. The groups (a) to (h), respectively, handle image processing of the pieces of divided image data (band data) corresponding to the respective band regions. Each piece of band data is further divided based on colors and the ASICs belonging to the respective groups (1) to (3) each perform image processing on a predetermined piece of color component data. Note that, although specific processing is described later, image data of cyan (C) and magenta (M) is generated in the group (1), image data of yellow (Y) and black (K) is generated in the group (2), and image data of light cyan (Lc), light magenta (Lm), and gray (Gy) is generated in the group (3).

As described above, the ASIC groups provided in the image processing unit 134 of this example have a connection configuration in which the number of serial connections is three and the number of parallel connections is eight. However, the number of ASICs forming the ASIC groups, the number of serial connections, and the number of parallel connections are not limited to those in the example illustrated in FIG. 5. The data amount of the image data to be processed, the types of colors, and the like are not limited to a particular amount or types.

Figure 6:
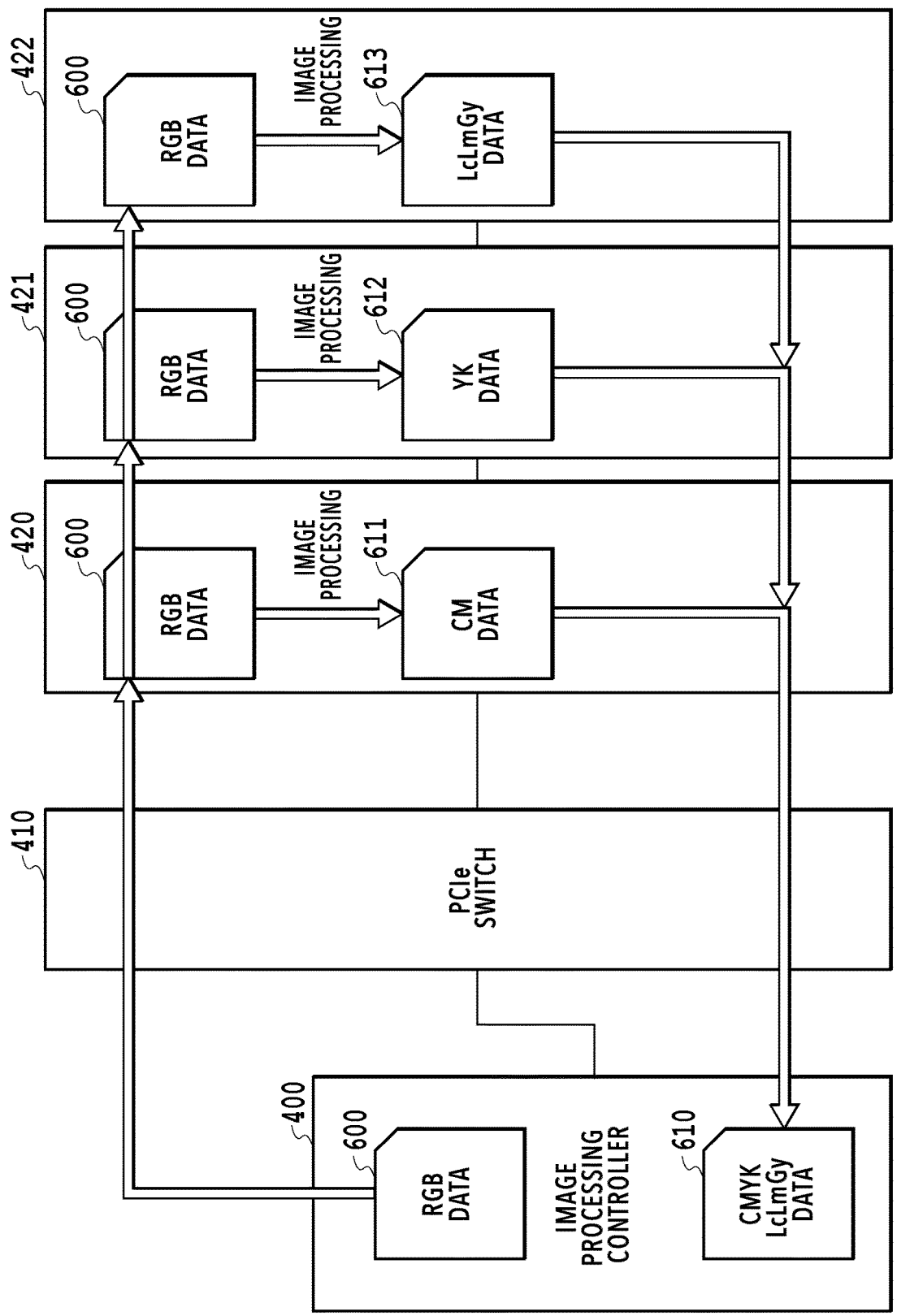
FIG. 6 is a diagram illustrating a flow of data in one group.

FIG. 6 is a diagram illustrating a flow of data in one of the aforementioned groups (a) to (h) and illustrates the input image data transferred from the image processing controller 400 and resultant data processed by the ASICs 420, 421, 422. Description is given below assuming that the input image data is RGB data and the resultant data is CMYKLcLmGy (C: cyan, M: magenta, Y: yellow, K: black, Lc: light cyan, Lm: light magenta, Gy: gray) data.

The RGB (R: red, G: green, B blue) data 600 transferred from the higher-level apparatus HC2 is stored in the image processing controller 400. The RGB data 600 is transferred to the ASIC 420 via the PCIe switch 410. The ASIC 420 executes image processing on the transferred RGB data 600 to generate CM data 611 and, at the same time, transfers the RGB data 600 to the ASIC 421. After completing the generation of the CM data 611, the ASIC 420 outputs the CM data 611 to the image processing controller 400 via the PCIe switch 410.

The ASIC 421 executes image processing on the transferred RGB data 600 to generate YK data 612 and, at the same time, transfers the RGB data 600 to the ASIC 422. After completing the generation of the YK data 612, the ASIC 421 transfers the YK data 612 to the ASIC 420. The ASIC 420 outputs the YK data 612 transferred from the ASIC 421 to the image processing controller 400 via the PCIe switch 410.

The ASIC 422 executes image processing on the RGB data 600 transferred from the ASIC 421 to generate LcLmGy data 613. After completing the generation of the LcLmGy data 613, the ASIC 422 transfers the LcLmGy data 613 to the ASIC 421. The ASIC 421 transfers the transferred LcLmGy data 613 to the ASIC 420. The ASIC 420 outputs the transferred LcLmGy data 613 to the image processing controller 400 via the PCIe switch 410. The image processing controller 400 integrates the CM data 611, the YK data 612, and the LcLmGy data 613 transferred from the ASIC 420 as described above and generates the CMYKLcLmGy data 610.

Note that, since the ASIC 420, the ASIC 421, and the ASIC 422 generate the pieces of color component data for the same band region, the same RGB data is inputted into the ASICs. For example, the ASIC 420 generates color component data of two colors C and M, the ASIC 421 generates color component data of two colors Y and K, and the ASIC 422 generates color component data of three colors Lc, Lm, and Gy. Since these pieces of color component data are pieces of data expressing the same image, the same RGB data is inputted.

Moreover, in the embodiment, the ASICs (ASIC 420, ASIC 421, ASIC 422) are used as the image processing modules that execute image processing on the RGB data and generate the CM data, the YK data, and the LcLmGy data. However, the image processing modules that generate the CM data, the YK data, and the LcLmGy data are not limited to the ASICs. Any module such as a field programmable gate array (FPGA) or a graphics processing unit (GPU) that can perform the image processing can be applied.

Moreover, the colors, the numbers of colors, and the combinations of the colors in the image data generated in each of the ASIC 420, the ASIC 421, and the ASIC 422 are not limited to those in the example illustrated in FIG. 6. The colors, the number of colors, and the combination of colors of in the image data generated in each ASIC can be changed. For example, the configuration may be such that the ASIC 420 generates image data of two colors C and K, the ASIC 421 generates image data of three colors Y, M, and Lm, and the ASIC 422 generates image data of two colors Lc and Gy.

Moreover, the colors included in the resultant data may include blue in addition to C, M, Y, K, Lc, Lm, and Gy and the colors of image data generated in each ASIC are not limited to particular colors.

In the embodiment, communication is performed in a so-called bucket brigade method in which the input image data and the resultant data is sequentially transferred among the ASIC 420, the ASIC 421, and the ASIC 422. However, the ASIC 420 and the ASIC 422 may directly communicate with each other and the communication method is not limited to a particular method.

Moreover in the embodiment, the color division is performed in total of three groups of the group (1), the group (2), and the group (3) and parallel processing is executed. The reason for employing three groups is that this configuration is the minimal configuration that can satisfy image processing speed required for the image processing device. The number of groups may be two or four and is not limited to a particular number as long as the required image processing speed can be satisfied.

Figure 7:
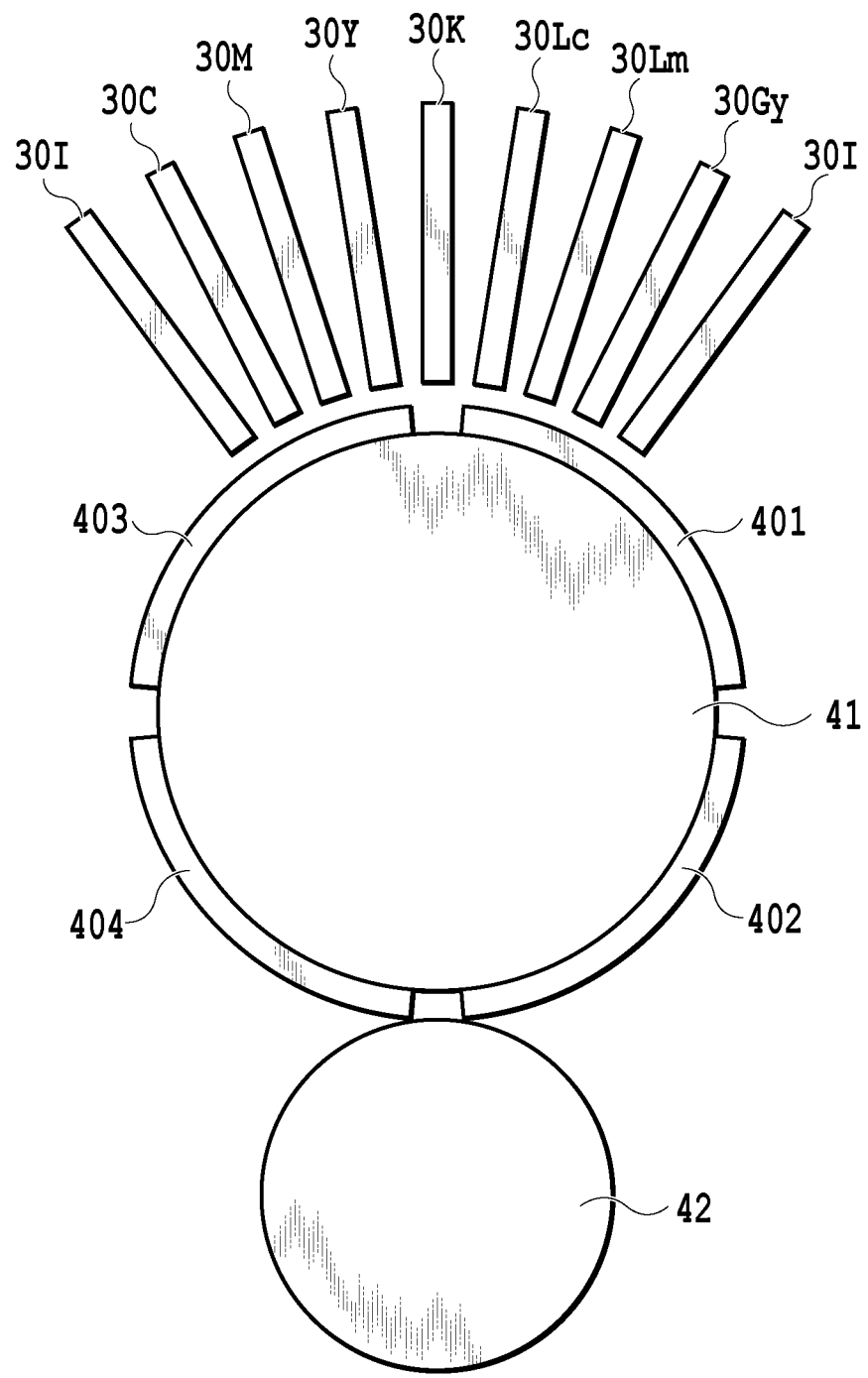
FIG. 7 is a diagram illustrating a transfer cylinder and its peripheral portions in the printing apparatus in an enlarged manner.

FIG. 7 is a diagram illustrating the transfer cylinder 41 and its peripheral portions in the printing apparatus 1 of the embodiment in an enlarged manner. Four arc-shaped transfer bodies 401, 402, 403, and 404 are attached to the transfer cylinder 41. The lengths of the respective transfer bodies 401 to 404 are determined to be the same. The inks ejected from the print heads 30 (30C, 30M, 30Y, 30K, 30Lc, 30Lm, 30Gy, 30I) land on the transfer bodies 401 to 404 and form images. Note that the print head 30I is a print head that ejects an image quality improving liquid used to improve the quality of images. The images formed on the transfer bodies are each transferred onto a sheet passing between the impression cylinder 42 and a corresponding one of the transfer bodies 401 to 404. In the embodiment, an image for one sheet is printed for the transfer body 401.

In the case of changing the printing speed, in the printing apparatus 1 of the embodiment, the number of transfer bodies to be used is changed without changing the rotation speed of the transfer cylinder 41 and the impression cylinder 42. For example, the speed in the case where the four transfer bodies 401 to 404 are used and the sheet feeding is performed at such timing that the sheets are fed one by one to all transfer bodies is assumed to the maximum printing speed. The printing speed can be changed to half the maximum printing speed by using only two transfer bodies 401 and 404 and performing the sheet feeding at such timing that the sheets are fed one by one to the transfer bodies 401 and 404. Moreover, the printing speed can be changed to ¼ of the maximum printing speed by using only the transfer body 401 and performing the sheet feeding at such timing that the sheets are fed one by one only to the transfer body 401.

Changing the printing speed in such a method can maintain constant printing time for each sheet and enables maintaining of uniform image quality. However, the printing speed can be changed by changing the drive frequency of the print heads 30 and the rotation speed of the transfer cylinder 41 and the impression cylinder 42 in the case where there is no large effect on the image quality.

Next, description is given of an image processing method executed in the embodiment by the image processing modules forming the image processing unit 134. In the embodiment, an error in the multiple (24 in the example) image processing modules (ASICs) provided in the image processing unit 134 as illustrated in FIG. 4 is detected and processing is performed depending on the number and position of the ASICs in which the error is occurring. Specifically, in the case where there is an ASIC in which an image processing error has occurred, groups formed of normal ASICs (normal modules) among the groups a to h generate the image data by sharing the work.

The image processing controller 400 determines whether each of the ASICs is in an error state or not by determining whether a command, a processing request, or the like can be sent to the ASIC in initialization or the image processing. Moreover, in the case where no response can be obtained from the ASIC after transmission of a command, a processing request, or the like for a certain period, the ASIC can be determined to be in the error state. Specifically, in FIG. 4, in the case where an initialization request cannot be sent from the ASIC 421 to the ASIC 422, the ASIC 422 is determined to be in the error state and the image processing controller 400 is notified of this matter via the ASIC 420. The image processing controller 400 records the matter that the ASIC 422 is in the error state in a memory. In the next image processing, the image processing controller 400 can know the image processing module in the error state from the contents recorded in the memory.

Moreover, as another example, there is a case where the image processing controller 400 sends the initialization request to, for example, the ASIC 420 and there is no response for a certain period. Also in this case, the image processing controller 400 determines that an error is occurring in the ASIC 420. In the embodiment, the configuration is such that, in the case where an error is occurring in the ASIC 420, the ASIC 421 and the ASIC 422 do not directly communicate with the image processing controller 400. Accordingly, the image processing controller 400 cannot send processing requests to the ASIC 421 and the ASIC 422. Thus, in the case where an error is occurring in the ASIC 420, in the embodiment, the ASIC 421 and the ASIC 422 are also handled to be in the error state and this matter is stored in the memory of the image processing controller 400.

In the aforementioned description, the examples are explained in which the image processing controller 400 determines that an error is occurring in the case where a command, a processing request, or the like cannot be transmitted and the case where there is no response for a certain period after the transmission. Alternatively, in the case where the image processing controller 400 does not receive image data of a certain color in the CMYKLcLmGy data subjected to the image processing, the image processing controller 400 may determine that an error is occurring in an image processing module handling the processing of this certain color. In other words, any method can be employed as long as the method can determine an image processing module (ASIC) in which an error is occurring, and specific processing in the method is not limited to particular processing.

Figure 8:
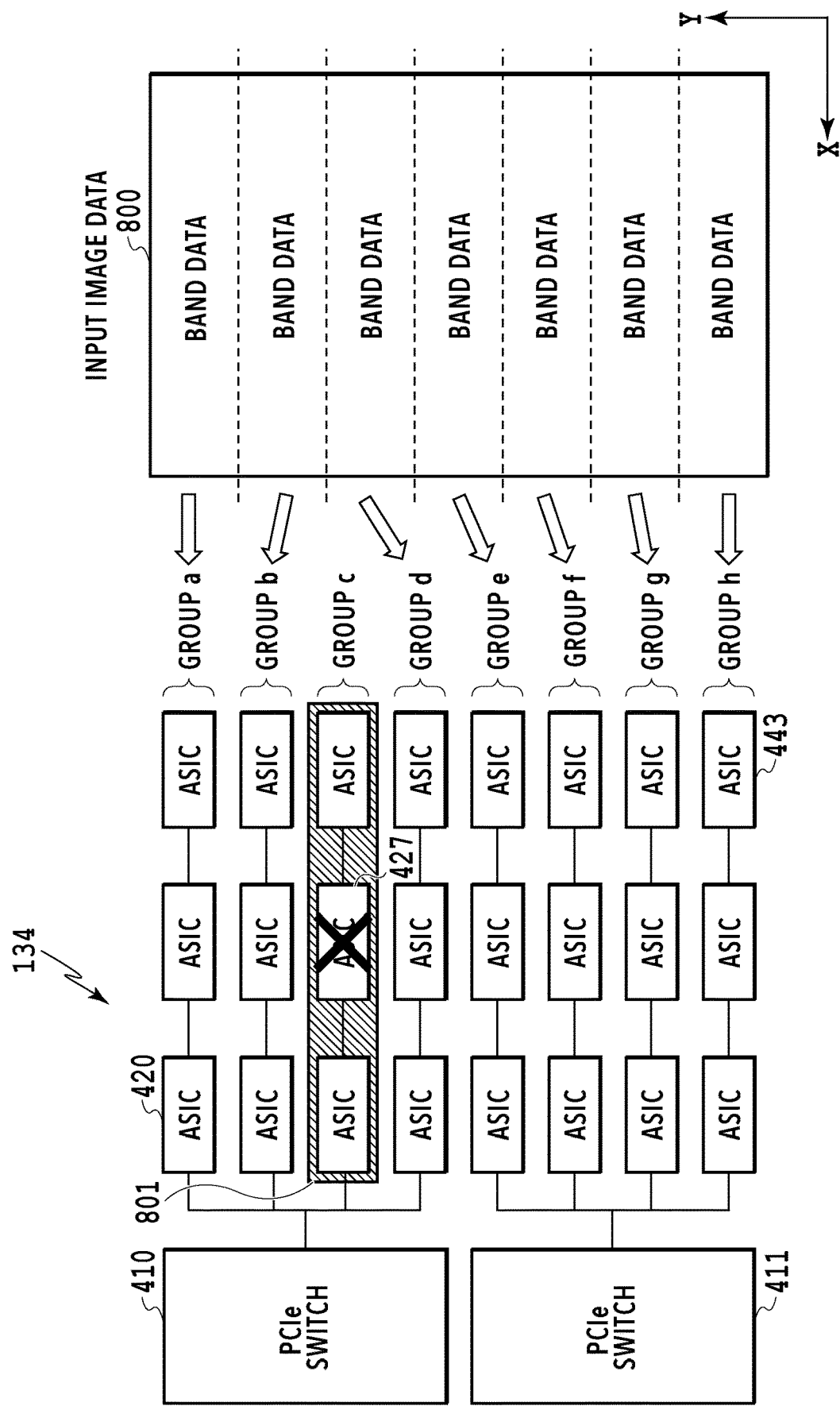
FIG. 8 is a diagram illustrating a state where an error has occurred in an ASIC.

The image processing executed in the embodiment is described below in further detail with reference to FIGS. 8, 9, 9A and 9B. FIG. 8 illustrates the case where an error has occurred in an ASIC 427 among the multiple image processing modules (ASICs) provided in the image processing unit 134 and the other image processing modules are in the normal state. In this case, usage of the group c (group illustrated in a hatched portion 801) that handles the processing of the same image region as the ASIC 427 is stopped. A total of seven other groups that are the groups a, b, and d to h are normal groups that can normally perform image processing. Accordingly, these seven groups are defined as usable groups and are made to perform the image processing by sharing the work.

Figure 9B:
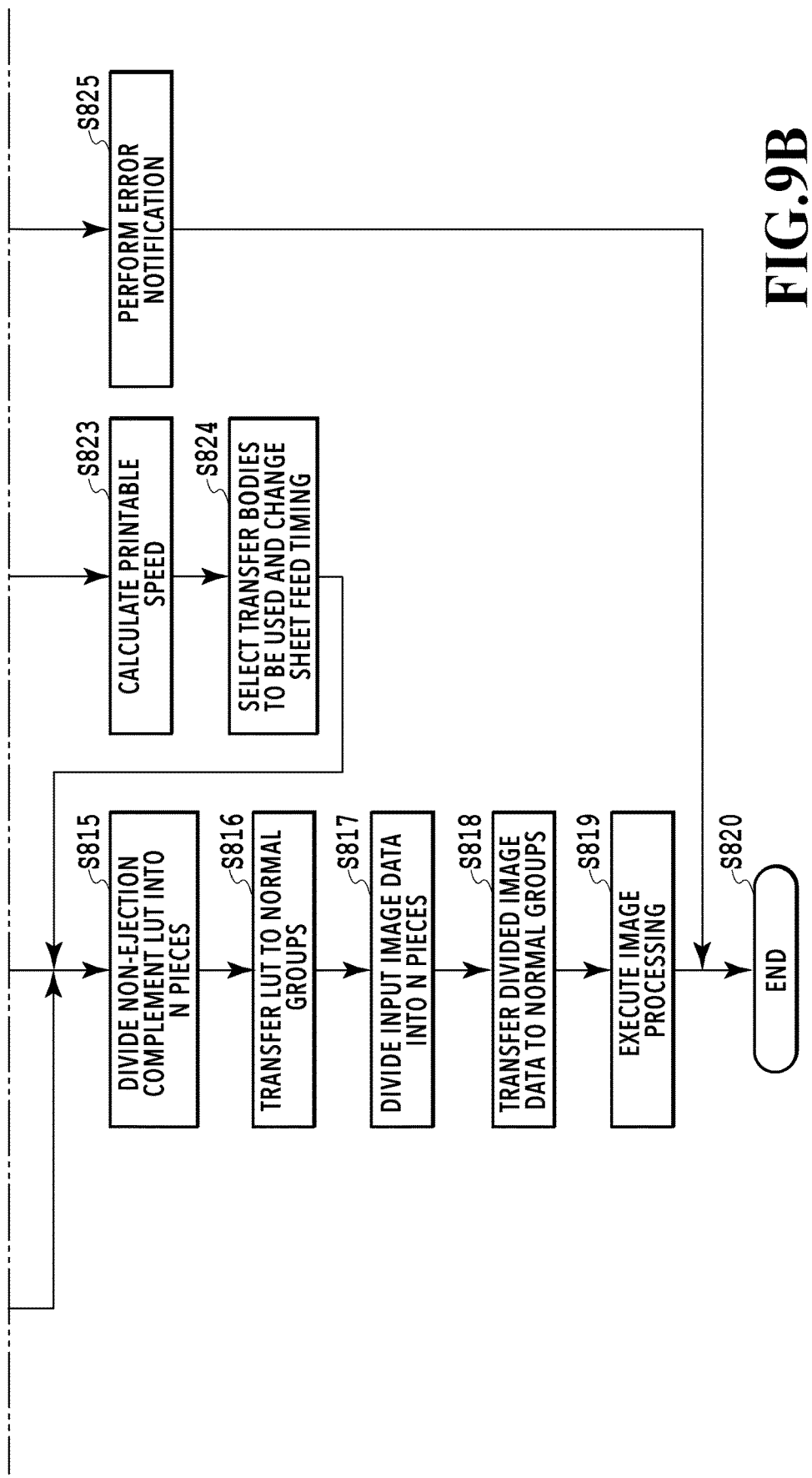

FIG. 9 is a diagram showing a relationship between FIG. 9A and FIG. 9B. FIGS. 9A and 9B are flowcharts illustrating steps of the image processing executed in the embodiment. Note that, in the flowcharts used in this embodiment and the other embodiments, the character S attached in front of each step number means step. In the case where the image processing unit 134 receives a request to start the image processing from the processing unit 131 (S810), the image processing controller 400 determines whether there is an image processing module (ASIC) in which an error is occurring (S811). This determination is performed by checking the contents recorded in the memory of the image processing controller 400 to determine presence or absence of an ASIC determined to be in the error occurrence state in the initialization or in the already-executed image processing and determine the position of the ASIC in the error state as described above.

In the case where the image processing controller 400 determines that there is no ASIC in which an error is occurring in S811, the image processing controller 400 sets the number of all groups ("8" in the example illustrated in FIG. 8) as the number N of normal groups capable of normally performing the image processing (S821). Next, in S815, the image processing controller 400 divides a non-ejection complement look-up table (hereafter, non-ejection complement LUT), provided to complement non-ejection nozzles in the print heads, into pieces as many as the number N of normal groups (=8). Then, the image processing controller 400 transfers the N pieces of divided non-ejection complement LUT to the respective normal groups (S816).

Next, in S817, the image processing controller 400 divides the input image data into N pieces (eight pieces) according to the number of bands and transfers the pieces of divided image data to the respective normal groups (S818). Thereafter, the image processing is executed in the ASICs of the normal groups (S819) and the series of processes is terminated at the point where the processing in all ASICs is completed (S820).

Meanwhile, in the case where the image processing controller 400 determines that there is an ASIC in an error state in S811, the image processing controller 400 sets the number of groups (normal groups) other than the group in which this ASIC is present as the number N (S812). Next, in S813, the image processing controller 400 checks whether the number of normal groups set in S812 is "0" or not. In the case where the image processing controller 400 determines that the number of normal groups is "0," the processing proceeds to S825 to perform error notification and the series of processes is terminated (S820).

Meanwhile, in the case where the image processing controller 400 determines that the number of normal groups is not "0" in S813, the processing proceeds to S814 and processing of determining processing speed of the image processing unit 134 is performed. The image processing controller 400 determines whether the processing speed is equal to or higher than image processing speed necessary to perform the printing operation (necessary processing speed) (S814). Specifically, the image processing controller 400 determines whether the processing speed is equal to or higher than image processing speed at which image processing of image data for performing printing on one sheet completes within a period from a timing at which printing on a preceding transfer body is started to a timing at which printing on the next transfer body is started in the case where the transfer cylinder 41 rotates at reference speed. In other words, the necessary processing speed described herein means image processing speed at which images can be continuously printed on the four transfer bodies 401 to 404 provided in the transfer cylinder 41 rotating at the reference speed.

In the case where the image processing controller 400 determines that the image processing speed is equal to or higher than the necessary processing speed as a result of the determination of S814 (in the case of YES), the image processing controller 400 sets the number N of normal groups as the dividing number and performs the aforementioned processing of S815 to S820. In the example illustrated in FIG. 8, the number N of groups to be used is set to "7." In the embodiment, in the case where the number of groups to be used is "7," printing speed similar to that in the case where the number of groups to be used is "8" can be achieved. In other words, printing can be continuously performed on the four transfer bodies 401 to 404. Accordingly, the aforementioned processing of S815 to S820 is performed after S814.

Meanwhile, in the case where the number N of normal groups set in S812 is "6" and the dividing number is set to "6," in the embodiment, the image processing speed is lower than the necessary processing speed. Accordingly, the processing proceeds from S814 to S822. In S822, the image processing controller 400 checks whether reduction of the currently-set printing speed is allowed. The checking method is not limited to a particular method. For example, the image processing controller 400 may refer to an allowable range of the printing speed set in advance or confirm with the user through an UI at this timing. Then, in the case where the reduction of the printing speed is not allowed, the error notification of S825 is performed and the processing is terminated (S820). Meanwhile, in the case where the reduction of the printing speed is allowed, speed at which printing can be performed with the current image processing speed is obtained through calculation (S823) and the sheet feed timing is changed while the transfer bodies to be used are selected depending on the obtained printing speed (S824).

In the case where the number of normal groups is 6, the two transfer bodies 401 and 403 or the two transfer bodies 402 and 404 among the fourth transfer bodies 401 to 404 are used in the embodiment. Moreover, sheet feeding is performed at one out of every two timings. Accordingly, the overall printing speed is half the speed in the case where the dividing number is set to "8." Thereafter, the processing of S815 to S820 is performed with the dividing number N set to 6.

As described above, in the embodiment, in the case where an error occurs in the multiple image processing modules (ASICs), the processing of image data is performed in a distributed manner by the normal groups other than the group including the ASIC in which the error has occurred. Accordingly, the printing operation is not stopped by stopping of the image processing and excellent throughput can be achieved.

Moreover, in the embodiment, the image processing unit 134 has a hybrid configuration incorporating both of parallel connection and series connection of the processing modules. Accordingly, it is possible to suppress an increase of data lines and an increase of the number of ports in the PCIe switches 410, 411 forming the data obtaining unit. Thus, it is possible to suppress an increase in the circuit scale while achieving higher processing speed than in parallel processing.

Second Embodiment

Next, a second embodiment of the present invention is described with reference to FIGS. 10, 11, 11A and 11B. Note that it is assumed that this embodiment also includes configurations similar to those in FIGS. 1 to 6. In the embodiment, as in the first embodiment, the normal groups formed of the image processing modules (ASICs) in which no error is occurring share the work of image processing. However, in some cases, there are few normal groups and the size of memories in the ASICs performing the image processing is insufficient. In the embodiment, processing for such cases is executed.

Figure 10:
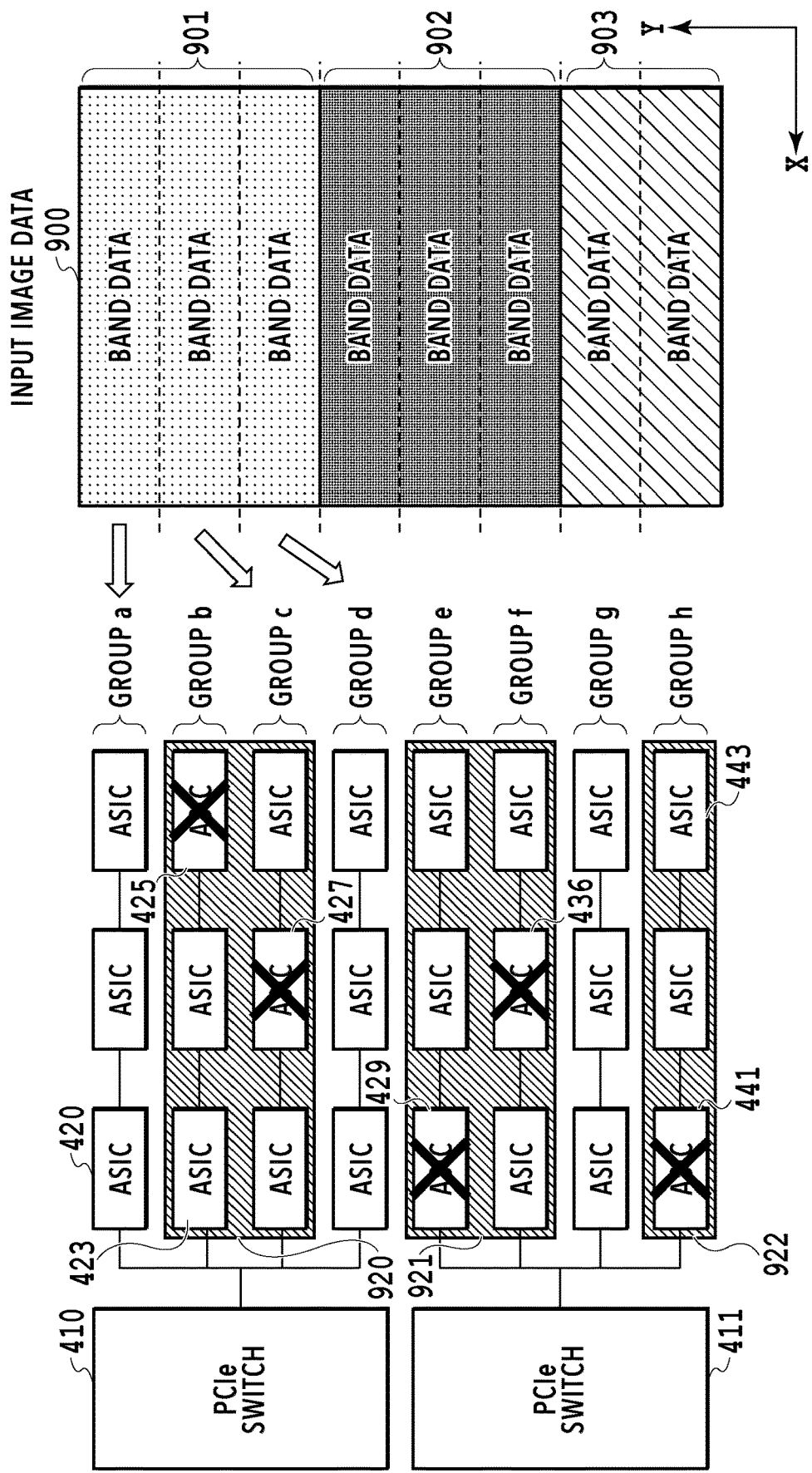
FIG. 10 is a diagram illustrating a state where errors have occurred in ASICs.

FIG. 10 illustrates an example in which errors have occurred in the image processing modules (ASICs) 425, 427, 429, 436, and 441 and the other image processing modules are in the normal state. In this example, usage of the groups b, c, e, f, and h (groups located in hatched portions 920, 921, 922) including the ASICs 425, 427, 429, 436, and 441 in the error state is stopped. In the image processing, a total of three groups of the normal groups a, d, and g perform the image processing while sharing the work. In the case where the number of normal groups is small as in this example, the size (storage capacity) of memories provided in the ASICs in the normal groups may be insufficient with respect to a use amount of these memories.

Figure 11B:
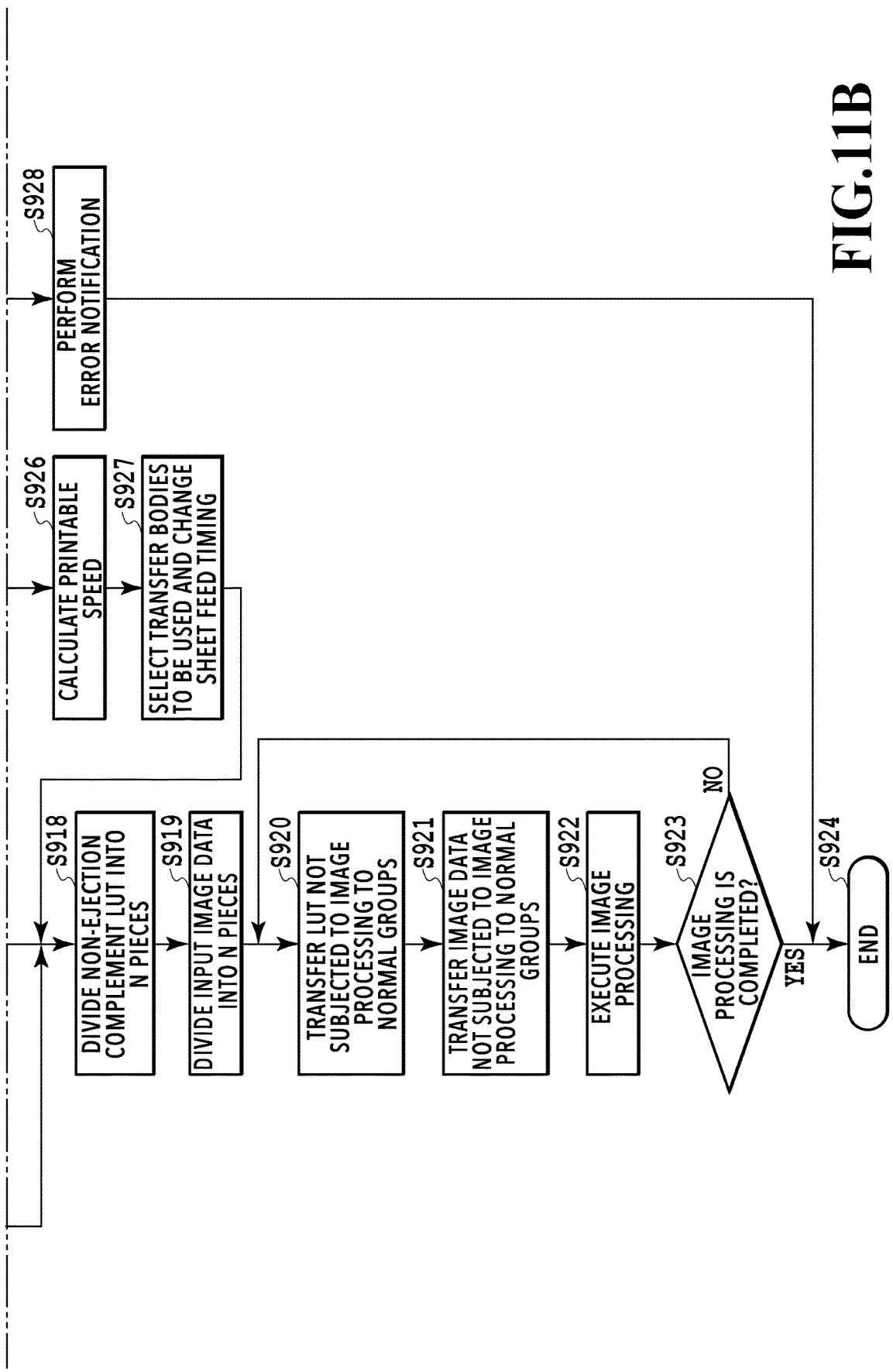

FIG. 11 is a diagram showing a relationship between FIG. 11A and FIG. 11B. FIGS. 11A and 11B are flowcharts illustrating steps of image processing executed in the embodiment. In FIGS. 11A and 11B, processes executed in S910 to S913 and S915 are the same as the processes executed in S810 to S813 and S821 in the first embodiment and overlapping description of these processes is omitted.

In the case where the image processing controller 400 determines that the number of normal groups is not "0" in S913, the image processing controller 400 determines whether the use amount of the memories provided in the ASICs in the normal groups exceeds the memory size thereof (S914). In this case, if the memory use amount does not exceed the memory size of these memories, the image processing controller 400 determines whether the image processing speed in the image processing unit 134 is equal to or higher than the necessary processing speed, while maintaining the state where the used group number is the number of normal groups (S917). This determination processing is the same as the processing of S814 described in the first embodiment.

Meanwhile, in the case where the image processing controller 400 determines that the memory use amount exceeds the memory size of the ASICs in S914, the image processing controller 400 sets N to the number of all groups ("8" in the example) (S916) and the processing proceeds to S917. Note that, the size of the memory of each ASIC is determined to be equal or greater than the memory use amount in the case where the input image data is divided by the number of all groups.

In the case where the image processing controller 400 determines that the processing speed of the image processing unit 134 is higher than the necessary processing speed (in the case of YES) in S917, the image processing controller 400 divides each of input image data 900 illustrated in FIG. 10 and the non-ejection complement LUT into N pieces (eight pieces) (S918, S919). Thereafter, in S920 and S921, the image processing controller 400 transfers pieces of unprocessed image data 901 for which the image processing is not performed and the pieces of non-ejection complement LUT corresponding to these pieces of image data to the normal groups a, d, g. Next, in S922, the image processing on the pieces of unprocessed image data 901 is executed by using the pieces of transferred non-ejection complement LUT. Thereafter, in S923, the image processing controller 400 checks whether the processing on the entire image data is completed. As illustrated in FIG. 10, at the time point where three pieces of band data (divided image data) 901 are processed, pieces of image data 902 and 903 are in an unprocessed state. Accordingly, the processing returns to S920 to repeat the processing of S920 to S923 and the image processing is performed on the pieces of unprocessed band data 902 and 903 illustrated in FIG. 10. Thereafter, at a time point where the processing for all pieces of image data 901 to 903 are completed, the series of processes is terminated (S923, S924).

In the state where there are three normal groups as illustrated in the example of FIG. 10, the possibility that the processing speed is lower than the necessary processing speed is high. In other words, the possibility of the determination result in S916 being NO is high. In the case where the image processing controller 400 determines that the processing speed is lower than the necessary processing speed, the image processing controller 400 performs processing of checking whether reduction of the currently-set printing speed is allowed (S925). In this case, if the reduction of the printing speed is not allowed, processing of error notification is performed (S928) and the series of processes is terminated (S924). Meanwhile, if the reduction of the printing speed is allowed, printing speed to which the speed is to be reduced is calculated depending on the image processing speed (S926) and the sheet feed timing is changed while the transfer bodies to be used are selected (S927).

In the case where the number of normal groups is "3," one of the four transfer bodies 401 to 404 is used and the sheet feeding is performed at one out of every four timings. The overall printing speed is thus set to ¼ of the maximum printing speed. Thereafter, the aforementioned processing of S918 to S923 is performed.

As described above, in the embodiment, also in the case where the number of normal groups is small and the memory size of ASICs to perform the image processing is insufficient, it is possible to perform processing on all pieces of image data and continuously execute the printing operation. Excellent throughput can be thereby achieved. Moreover, effects such as size reduction of the apparatus, reduction of wirings, and reduction of the number of ports in the PCIe switches 410, 411 can also be obtained as in the first embodiment.

Third Embodiment

Figure 12:
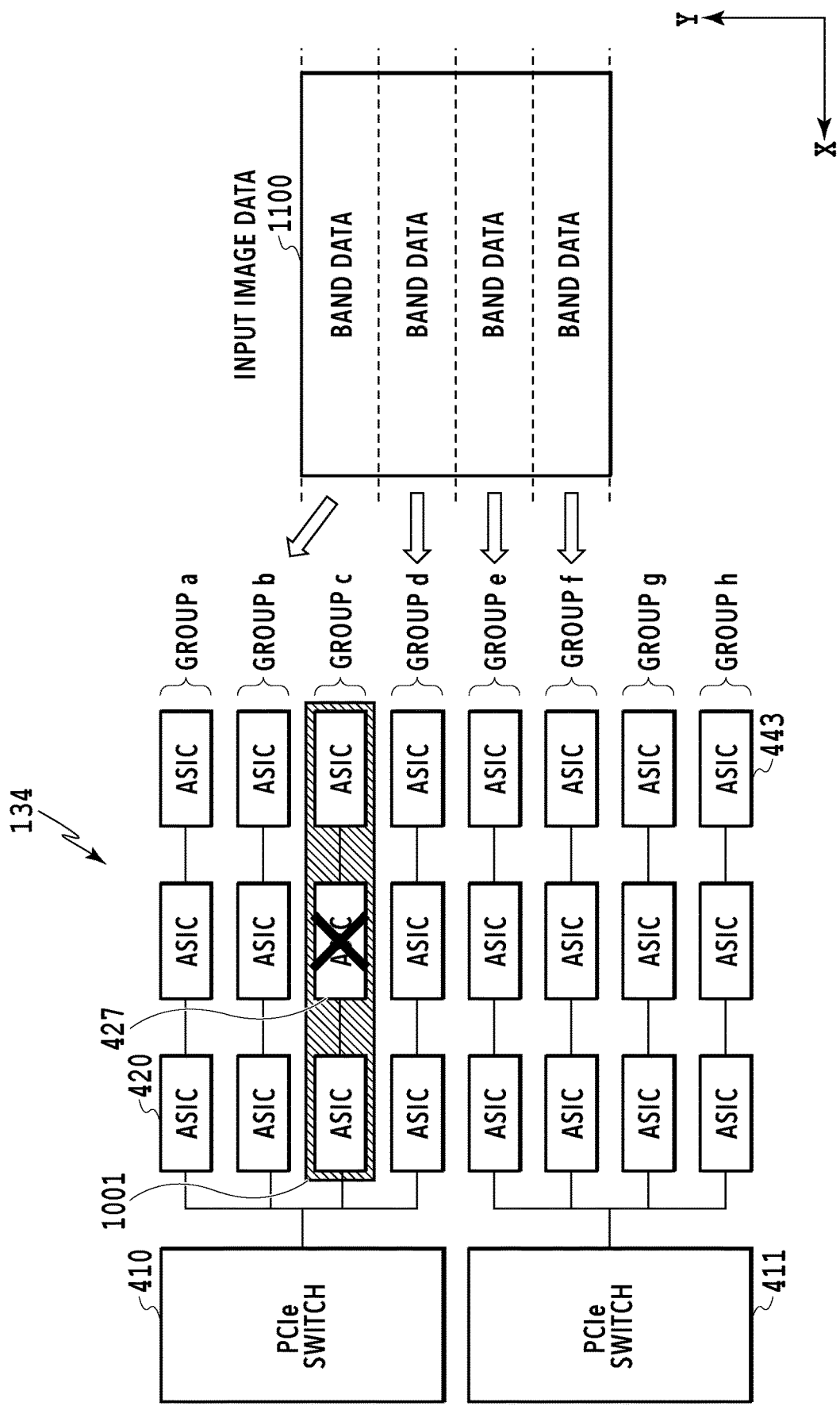
FIG. 12 is a diagram illustrating a state where an error has occurred in an ASIC.

Next, a third embodiment of the present invention is described with reference to FIGS. 12, 13, 13A and 13B. Note that it is assumed that this embodiment also includes configurations similar to those in FIGS. 1 to 6. In the embodiment, there is performed processing preferable for the case where a sheet with a small size is used. In the embodiment, in the case where the sheet to be used has a small size, processing on the image data can be executed by using some of the multiple image processing modules (ASICs) provided in the image processing unit 134. For example, in the case where printing is to be performed by using an A3 sheet, as illustrated in FIG. 12, the necessary processing speed can be achieved by using four groups of groups c to f in the image processing unit 134. However, in the example illustrated in FIG. 12, a state where an error has occurred in the ASIC 427 is illustrated. In this case, the group c including the ASIC 427 is not used in the image processing.

Figure 13B:
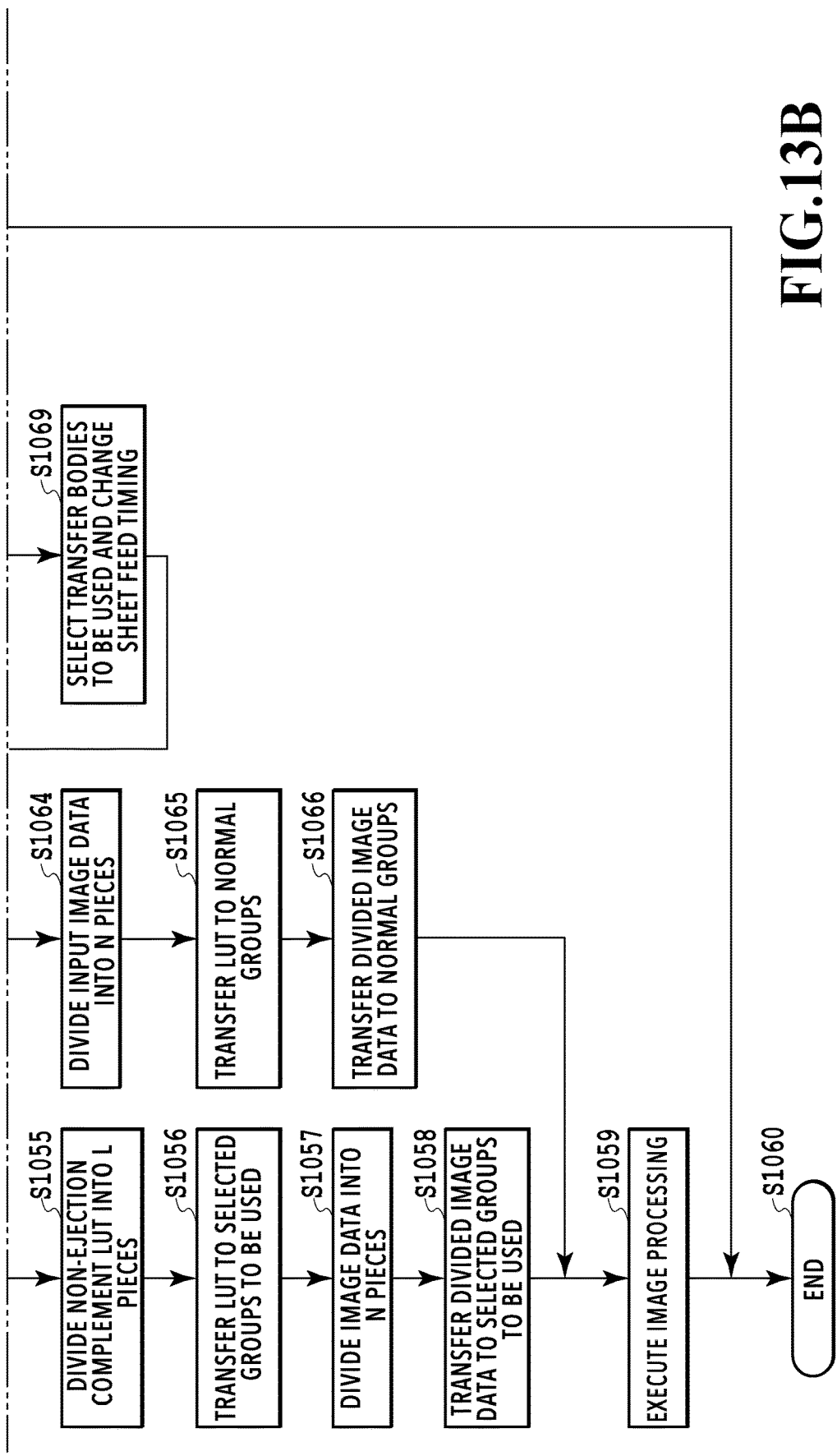

FIG. 13 is a diagram showing a relationship between FIG. 13A and FIG. 13B. FIGS. 13A and 13B are flowcharts illustrating steps of the image processing in the embodiment. In the case where the image processing unit 134 receives a request to start the image processing (S1050), the image processing controller 400 sets the number M of groups to be used and the number N of normal groups (S1051). In the example illustrated in FIG. 12, the number M of groups to be used is set to 4 and the number N of normal groups is set to 7. In this case, the number M of groups to be used is compared with the number N of normal groups. In the case where the number N of normal groups is equal to or greater than the number M of groups to be used, the processing proceeds to S1053 and L is set to the number of all groups. Next, in S1054, the image processing controller 400 selects groups to be used from the normal groups.

In the example, the groups b and the groups d to f are selected. Thereafter, the image processing controller 400 divides the non-ejection complement LUT into pieces as many as the number L (in the example, L=8) of all groups set in advance (S1055) and transfers a corresponding piece of non-ejection complement LUT to each of the selected groups to be used (S1056). Moreover, in S1057, the image processing controller 400 divides the image data into pieces as many as the number M (in the example, M=4) of groups to be used (S1057) and transfers a corresponding piece of divided image data to each of the selected groups to be used. Then, the image processing on the pieces of image data is performed in the groups to be used and the series of processes is terminated (S1060).

Meanwhile, in the case where the image processing controller 400 determines that the number N of normal groups is smaller than the number M of groups to be used in S1052, the image processing controller 400 determines whether the number of normal groups is "0" or not (S1061). In the case where the number of normal groups is "0" in a result of determination, error notification is performed (S1070) and the processing is terminated (S1060). Meanwhile, in the case where the image processing controller 400 determines that the number of normal groups is not "0," in S1062, the image processing controller 400 determines whether the processing speed of the image processing unit 134 is equal to or higher than the processing speed necessary to perform the printing operation (necessary processing speed). In the case where the image processing controller 400 determines that the processing speed is equal to or higher than the necessary processing speed, the image processing controller 400 divides each of a necessary region in the non-ejection complement LUT and the image data into N pieces (S1063, S1064). In this example, since the processing speed is equal to or higher than the necessary processing speed, the image processing controller 400 divides each of the non-ejection complement LUT and the image data into N pieces (four pieces) (S1063, S1064). Then, the image processing controller 400 transfers the pieces of divided non-ejection complement LUT and the pieces of divided image data to the normal groups (S1065, S1066). Thereafter, the image processing is executed on the pieces of image data by using the pieces of non-ejection complement LUT in the normal modules in the normal groups and the series of processes is terminated (S1060).

Moreover, in the case where the number M of groups to be used is greater than the number N of normal groups and the number N of normal groups is small, for example, is "2," the possibility that the processing speed of the image processing unit 134 is lower than the necessary processing speed is high. In the case where the processing speed is lower than the necessary processing speed as described above, the image processing controller 400 checks whether reduction of the printing speed is allowed (S1062). In the case where the reduction of the printing speed is not allowed, error notification is performed in S1070 and then the series of processes is terminated (S1060). Meanwhile, in the case where the reduction of the printing speed is allowed, the image processing controller 400 obtains speed at which the printing can be performed (printable speed) through calculation based on the current processing speed and the necessary processing speed (S1068). Then, the transfer bodies to be used are selected and the sheet feed timing is changed based on the obtained printable speed (S1069). In the case where the number of normal groups is "2," two of the four transfer bodies are selected as the transfer bodies to be used and the sheet feeding is performed at one out of every two timings. The overall printing speed is thereby set to half the maximum printing speed. Thereafter, the processing of S1063 to S1066 is performed, then the image processing of S1059 is performed, and the series of processes is terminated (S1060).

As described above, in the embodiment, effects such as size reduction of the apparatus, reduction of wirings, and reduction of the number of ports in the PCIe switches 410, 411 can be obtained as in the first or second embodiment. Moreover, in the case where a sheet of a small size is used, it is possible to continuously execute the image processing by using only the normal groups and avoiding use of the group including the image processing module (ASIC) in which an error has occurred. Thus, it is possible to continuously execute the printing operation for multiple printing media and improve the throughput.

Fourth Embodiment

Next, a fourth embodiment of the present invention is described with reference to FIGS. 14, 15, 15A and 15B. Note that it is assumed that this embodiment also includes configurations similar to those in FIGS. 1 to 6. The printing apparatus 1 in the embodiment has a configuration capable of forming images by using the inks of seven colors as illustrated in FIGS. 1 and 2. However, there is a printing mode in which, instead of using all of the inks of seven colors, an image is printed by using inks of limited colors. In the embodiment, there is performed processing preferable in the case where the printing is performed by using inks of limited colors as described above.

Figure 14:
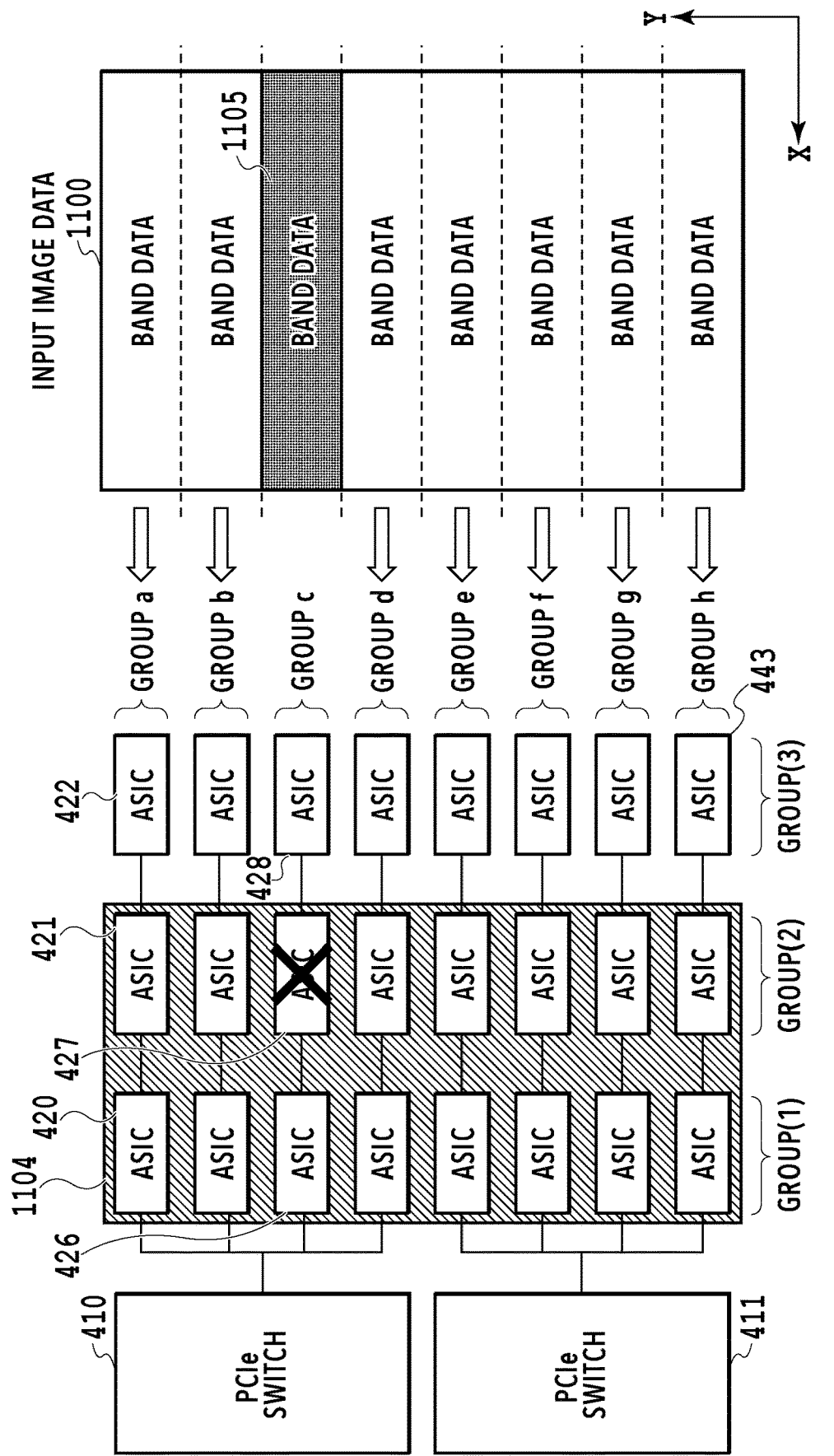
FIG. 14 is a diagram illustrating a state where an error has occurred in an ASIC.

In the case where the printing apparatus 1 is set to a mode in which the printing is performed with the inks to be used limited to the inks of four colors, the number of colors for which processing is performed is small. Accordingly, as illustrated in FIG. 14, only the image processing modules (ASICs) located in a hatched region 1104 are used. In other words, only the ASICs in the groups (1) and (2) are used. The group (1) processes image data of two colors (for example, two colors of C and M) and the group (2) processes image data of the other two colors (for example, two colors of Y and K). Note that, although the group (3) is provided in mind of processing of image data of additional other three colors (for example, three colors of Lc, Lm, Gy), since only the inks of four colors are handled in this case, the image processing modules (ASICs) of the group (3) are not used.

Moreover, in the example illustrated in FIG. 14, the case where the ASIC 427 belonging to the group (2) is in the error state is illustrated. In ordinary circumstances where there is no error in the ASIC 427, the ASIC 426 and the ASIC 427 belonging to the group c process a piece of image data (band data 1105) in the image data 1100. However, since the ASIC 427 is in the error state in this example, one of the ASICs in the unused group 3 (for example, the ASIC 422) processes the image data.

Figure 15B:
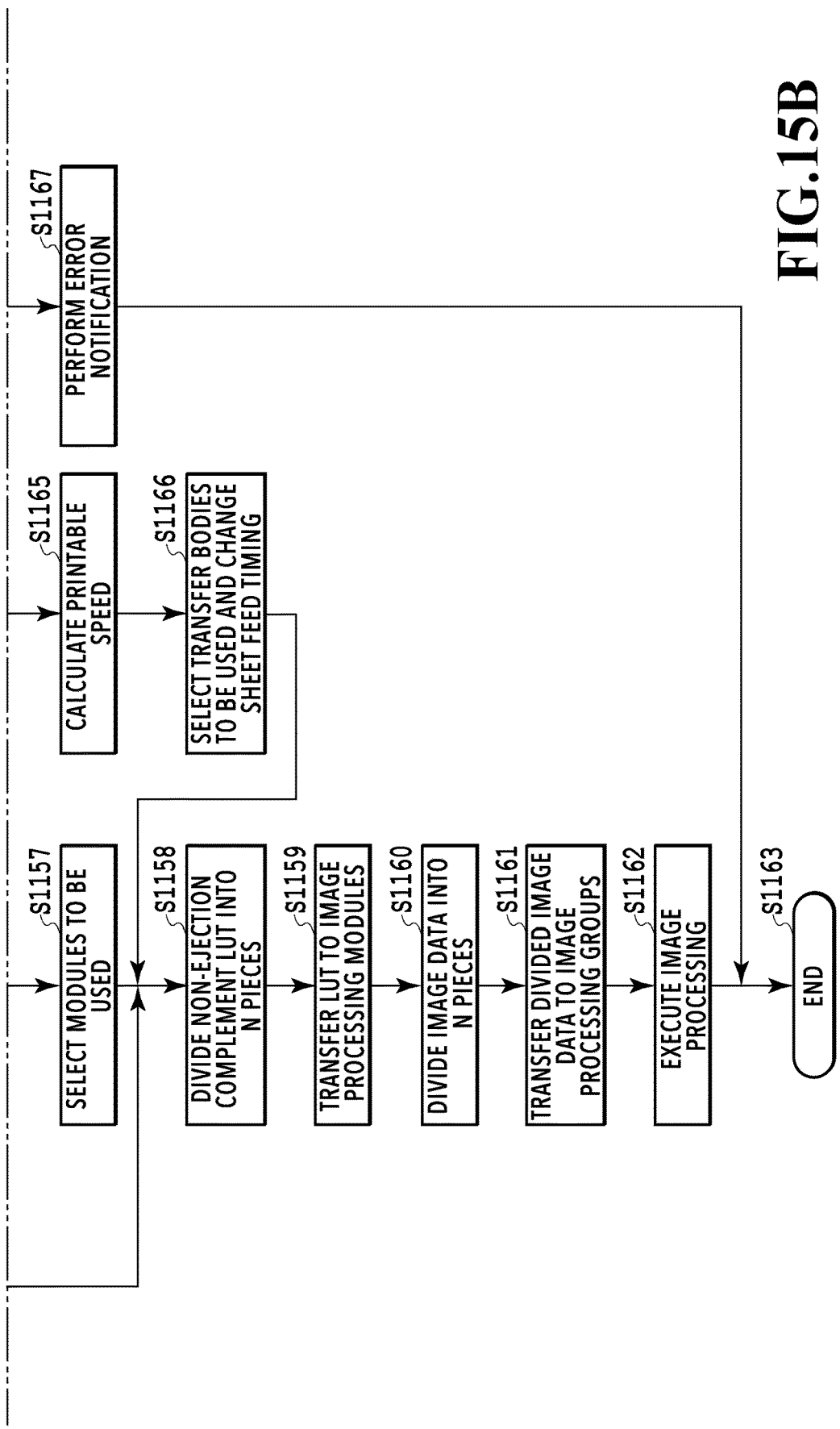

FIG. 15 a diagram showing a relationship between FIG. 15A and FIG. 15B. FIGS. 15A and 15B are flowcharts illustrating steps of image processing executed in the embodiment. In the case where the image processing unit 134 receives a request for the image processing (S1150), the image processing controller 400 determines whether there is an ASIC in the error state among the ASICs to be used (ASICs in the region 1104 of FIG. 14) (S1151). Thereafter, in the case where there is no ASIC in the error state among the ASICs to be used, the image processing controller 400 sets the value of N to "8" which is the number of all groups (eight groups of groups a to h in this example) that perform the processing on the input image data 1100 (S1153). Then, in S1158, the image processing controller 400 divides the non-ejection complement LUT into N pieces (eight pieces) and, in S1159, transfers the pieces of divided non-ejection complement LUT to the corresponding ASICs, respectively. Moreover, in S1160, the image processing controller 400 divides the input image data 1100 into N pieces (eight pieces) and transfers the pieces of divided image data (band data) to the corresponding ASICs (S1161). Note that, in the embodiment in which the inks of four colors are used, the eight pieces of each of the divided non-ejection complement LUT and the divided image data (band data) are transferred to the ASICs belonging to the groups a to h and also belonging to the groups (1) and (2).

Moreover, in the case where the image processing controller 400 determines that there is an image processing module (ASIC) in which an error is occurring in S1151, the image processing controller 400 checks whether there is a normal module among unused ASICs (S1152). In this case, the unused ASICs refers to the ASICs belonging to the group (3). Moreover, the normal ASIC refers to the ASIC that is in a state capable of exchanging data with the image processing controller 400 via the PCIe switch (410, 411) (not illustrated in FIG. 14 (see FIG. 4)) and that is capable of performing normal image processing. Specifically, the unused and normal ASIC corresponds to any of the ASICs (for example, ASIC 422 or the like) in the group (3), excluding the ASIC 428 connected to the ASIC 427 in the error state and being in a state unable to communicate.

In the case where the image processing controller 400 determines that there is no normal and unused ASIC in S1152, the error notification is performed (S1167) and the processing is terminated (S1163). Meanwhile, in the case where the image processing controller 400 determines that there is a normal and unused ASIC, in S1154, the image processing controller 400 sets L to the number of unused and normal modules ("7" in the example of FIG. 14) and sets M to the number of ASICs in the error state among the ASICs to be used ("1" in the example of FIG. 14). Moreover, the image processing controller 400 sets the value of N to the number of all groups ("8" that is the number of groups a to h in the example of FIG. 14).

Thereafter, in S1155, the image processing controller 400 compares L with M. In the case where the number L of normal and unused modules is smaller than the number M of ASICs in the error state, error notification is performed (S1167) and the processing is terminated (S1163). Meanwhile, in the case where the number L of normal and unused modules is greater than the number M of ASICs in the error state, the image processing controller 400 determines whether the image processing speed in the image processing unit 134 is equal to or higher than the necessary processing speed (S1156). This determination processing is the same as the processing of S814 described in the first embodiment. In the case where the image processing controller 400 determines that the image processing speed is equal to or higher than the necessary processing speed in S1156, the image processing controller 400 selects the modules to be used in S1157 and executes the aforementioned processing of S1158 to S1163.

Meanwhile, in the example illustrated in FIG. 14, the group a performs image processing on the image data to be handled by the group a and performs processing on the image data that should have been handled by the ASIC 427 of the group c in the error state. Accordingly, the processing speed of the image processing unit 134 as a whole may be lower than the necessary processing speed. In the case where the processing speed is lower than the necessary processing speed, the image processing controller 400 checks whether reduction of printing speed is allowed (S1164). In the case where the reduction of printing speed is not allowed, error notification is performed in S1167 and the processing is terminated (S1163). Meanwhile, in the case where the reduction of printing speed is allowed, the printable speed is calculated (S1165), the transfer bodies to be used are selected, and the sheet feed timing is changed (S1166). In this case, two of the four transfer bodies are used and sheet feeding is performed at one out of every two timings. The overall printing speed is thereby set to half the maximum printing speed. Thereafter, the aforementioned processing of S1158 to S1163 is performed.

As described above, in the embodiment, effects such as size reduction of the apparatus, reduction of wirings, and reduction of the number of ports in the PCIe switches 410, 411 can be obtained as in the first or second embodiment. Moreover, in the case where the printing operation is performed with the inks to be used being limited to inks of certain colors, the processing on all pieces of image data is performed while using the unused image processing module (ASIC). Thus, it is possible to continuously execute the printing operation for multiple printing media and improve the throughput.

Fifth Embodiment

Figure 16:
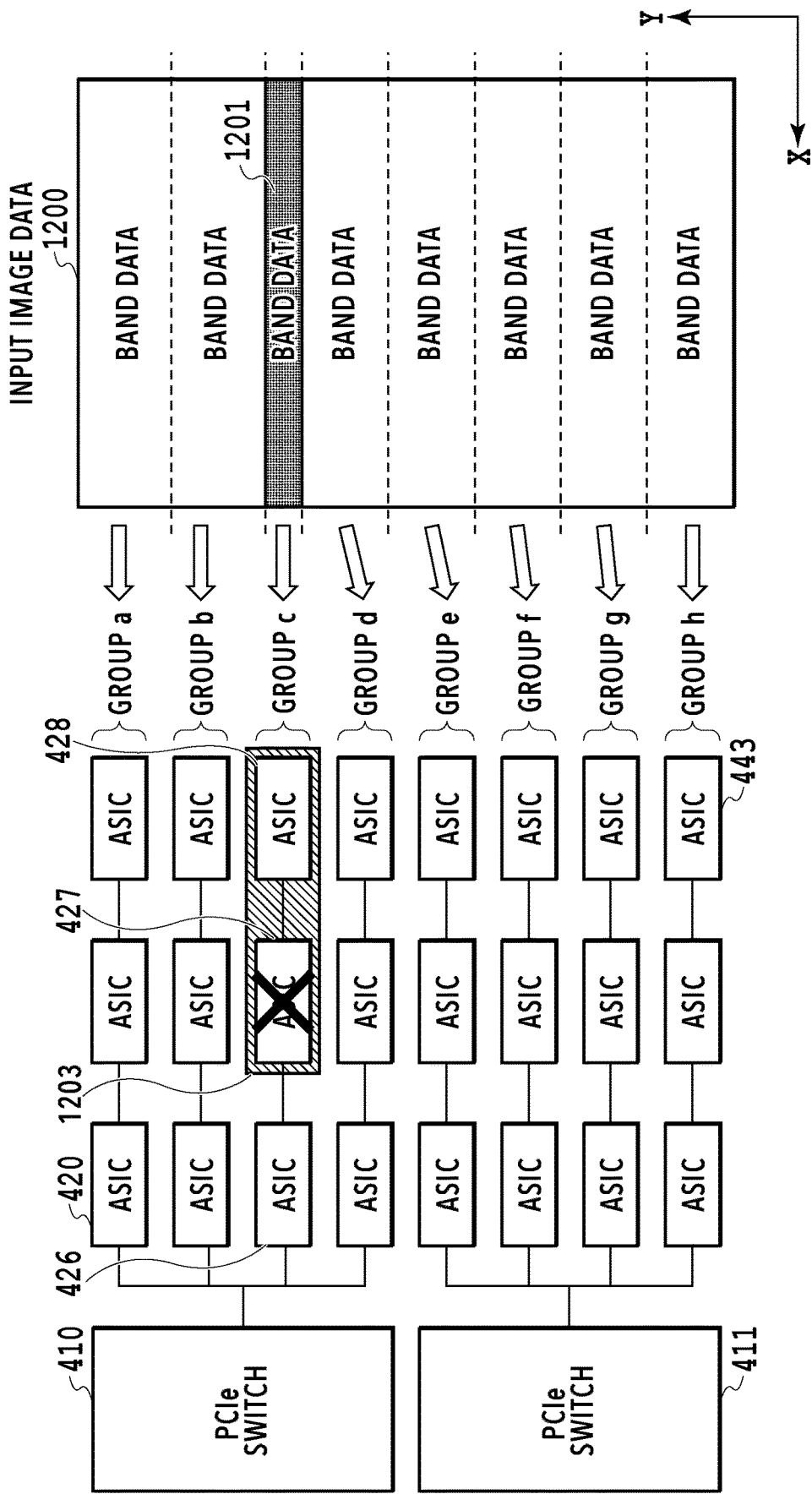
FIG. 16 is a diagram illustrating a state where an error has occurred in an ASIC.

Next, a fifth embodiment of the present invention is described with reference to FIGS. 16, 17, 17A and 17B. Note that it is assumed that this embodiment also includes configurations similar to those in FIGS. 1 to 6. FIG. 16 illustrates the case where the multiple image processing modules (ASICs) provided in the image processing unit 134 include a module in the error state (for example, ASIC 427). In this case, the ASIC 428 included in a hatched portion 1203 among the ASICs connected in series with the ASIC 427 in the error state is not directly connected to the PCIe switch 410. Accordingly, even if the ASIC 428 is normal, the ASIC 428 cannot perform communication with the image processing controller 400 because the ASIC 427 is in the error state. In other words, the ASIC 428 is an unusable ASIC.

Meanwhile, the ASIC 426 connected to the ASIC in the error state is directly connected to the PCIe switch 410 and can thus communicate with the image processing controller 400. Thus, the ASIC 426 is a usable module. Accordingly, in the embodiment, image processing for image data (band data) 1201 to be handled by the group c formed of the ASICs 426, 427, and 428 is performed only by the ASIC 426. However, since the processing of image data for the group c is performed only by one ASIC 426, the amount of image data assigned to the group c with respect to input image data 1200 is made smaller than other pieces of band data as in a shaded region 1201.

Figure 17B:
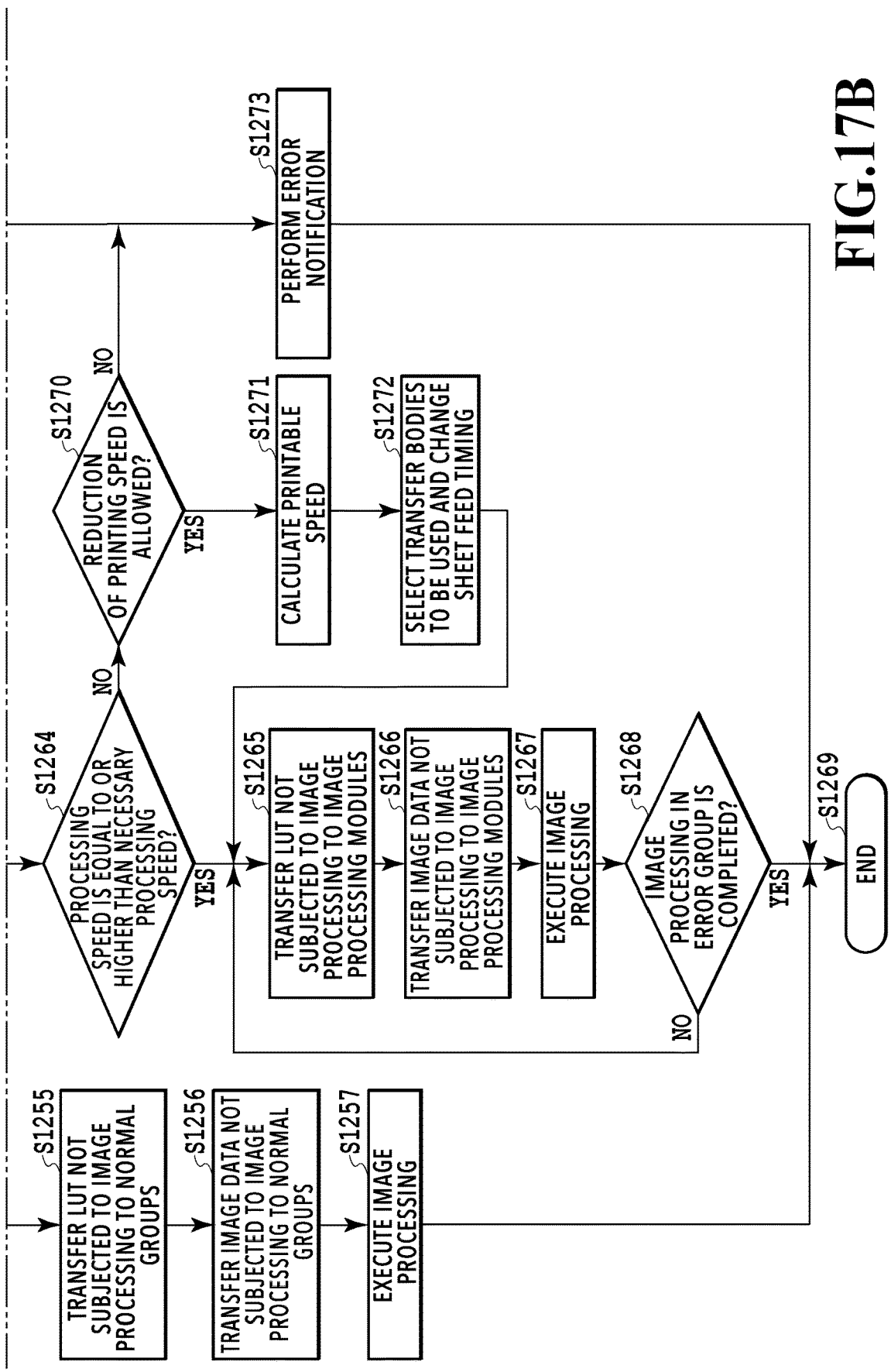

Steps of image processing executed in the embodiment is described below with reference to the flowcharts illustrated in FIGS. 17A and 17B. Note that FIG. 17 is a diagram showing a relationship between FIG. 17A and FIG. 17B. In the case where the image processing unit 134 receives the image processing request (S1250), the image processing controller 400 determines whether there is an image processing module (ASIC) in which an error is occurring (S1251). In the case where there is no ASIC in the error state, the image processing controller 400 sets the value of N to "8" that is the number of all groups (eight groups of groups a to h in this example) (S1252).

Next, in S1253 and S1254, the image processing controller 400 divides each of the non-ejection complement LUT and the image data into N pieces (eight pieces). Then, the image processing controller 400 transfers pieces of LUT and pieces of divided image data not subjected to processing among the pieces of divided image data to the groups (S1255 and S1256). Thereafter, the image processing is executed in S1257 and the series of processes is terminated (S1269).

Meanwhile, in the case where there is an error module in S1251, the image processing controller 400 sets the value of N to the number of normal groups (S1259) and sets the value of M to the number of usable error occurrence groups (S1260). The usable error occurrence group means a group in which one or more ASICs in the error state are present but at least the ASIC connected to the PCIe switch is normal. In FIG. 16, the group c corresponds to the usable error occurrence group. Accordingly, in the example illustrated in FIG. 16, the value of N is set to "7" and the value of M is set to "1."

Next, in S1261, the image processing controller 400 determines whether both of the values of N and M are "0" or not. In the case where the values of N and M are "0" (in the case of YES), there is no normal ASIC. Thus, error notification is performed (S1273) and the processing is terminated (S1269). Meanwhile, in the case where the determination result of S1261 is NO, the processing proceeds to S1262 and the image processing controller 400 determines whether the value of M is "0". In the case where the image processing controller 400 determines that the value of M is "0" in S1262, the image processing controller 400 sets the dividing number to N and performs the aforementioned processing of S1253 to S1257 and the series of processes is terminated (S1269).

Meanwhile, in the case where the image processing controller 400 determines that M is not 0 in S1262, in S1263, the image processing controller 400 divides the non-ejection complement LUT and the image data such that the processing speeds of the respective groups are even. Thereafter, the image processing controller 400 calculates the processing speed in the image processing unit 134 and determines whether the processing speed is lower than the necessary processing speed (S1264). In the case where the processing speed is not lower than the necessary processing speed (in the case of YES), the pieces of non-ejection complement LUT and pieces of image data (band data) not subjected to processing are transferred to the corresponding groups (S1265, S1266) and the image processing is executed (S1267).

After the execution of the image processing, the image processing controller 400 checks whether the image processing in the error occurrence group is completed. In the case where the image processing is completed, the series of processes is terminated (S1269). In the example illustrated in FIG. 16, one ASIC 426 performs the processing of the group c including three ASICs. Accordingly, the group c repeats the processing of S1265 to S1268 three times and then the processing is terminated (S1269).

As described above, in the example illustrated in FIG. 16, one ASIC 426 performs the image processing that is to be performed by three ASICs 426, 427, 428 in ordinary circumstances. Thus, the processing speed is likely to be lower than the necessary processing speed. In the case where the image processing controller 400 determines that the processing speed is lower than the necessary processing speed in S1264, the image processing controller 400 checks whether reduction of printing speed is allowed (S1270). In the case where the reduction of the printing speed is allowed, the image processing controller 400 obtains a printing speed at which the printing operation can be performed with the current processing speed (printable speed) through calculation (S1271). Then, the transfer bodies to be used are selected and the sheet feed timing is changed depending on the obtained result (S1272). In this case, one of the four transfer bodies is selected and the sheet feeding is performed at one out of every four timings. The overall printing speed is thus ¼ of the maximum printing speed and the printing can be handled at the current processing speed. Then, the aforementioned processing of S1265 to S1268 is performed and the processing is terminated (S1269). Meanwhile, in the case where the image processing controller 400 determines that the reduction of printing speed is not allowed in S1270, error notification is performed (S1273) and the processing is terminated (S1269).

As described above, in the embodiment, effects such as size reduction of the apparatus, reduction of wirings, and reduction of the number of ports in the PCIe switches 410, 411 can be obtained as in the first or second embodiment. Moreover, a group including an ASIC in the error state is handled as a usable group in the case where this group includes a normal ASIC capable of communicating and performing the image processing, and the image processing is performed by using the normal ASIC. Processing of all pieces of image data can be thereby performed. Accordingly, the possibility of continuously executing the printing operation for multiple print media is improved and the throughput can be improved. Moreover, effects such as size reduction of the apparatus, reduction of wirings, and reduction of the number of ports in the PCIe switches 410, 411 can also be obtained.

Other Embodiments

Although the printing unit 3 includes multiple print heads 30 in the aforementioned embodiment, the present invention can also be applied to a printing apparatus including one print head 30. Moreover, the printing apparatus to which the present invention is applied is not limited to a printing apparatus employing a full-line method in which printing is performed by using a full-line head. For example, the present invention can also be applied to a printing apparatus employing a serial method in which printing is performed by main-scanning the print heads 30 in a direction orthogonal to an arrangement direction of the ejection ports.

Moreover, although the transfer body 40 is provided on the outer peripheral surface of the transfer cylinder 41 in the aforementioned embodiment, a method in which the transfer body 40 is formed in an endless belt shape and is made to circulate may be employed. Furthermore, the present invention can be implemented by processing of supplying a program that implements one or more of the functions in the aforementioned embodiments to a system or an apparatus via a network or a storage medium and causing one or more of processors in a computer of this system or apparatus to read and execute the program. Moreover, a control unit such as an image processing controller may be implemented by a circuit (for example, ASIC) that implements one or more of the functions.

Furthermore, in the aforementioned embodiments, the image processing unit 134 forming the image processing device obtains (calculates) the printable speed (printing speed) in the printing apparatus 1 based on the processing speed and the engine controller 13B controls the printing speed according to the obtained printable speed. However, the obtaining of the printing speed may be performed by the engine controller 13B, instead of the image processing device. In other words, a printing speed obtaining unit is not an essential unit in the image processing device according to the present invention and the image processing device including no obtaining unit can achieve a desired objective as the image processing device.

Moreover, the processes in the aforementioned first to fifth embodiments may be selectively executed based on setting made by the user, printing conditions determined in the printing apparatus, a state in the printing operation, or the like. For example, the processes in the aforementioned first to fifth embodiments may be selectively executed based on conditions such as the data amount of image data, the size of sheet to be used, the number of ink colors to be used, the position of an image processing module in which an error has occurred, and the like.

Furthermore, although the examples in which the printing operation is continuously performed for multiple print media are described in the aforementioned embodiments, the present invention is effective also in the case where the printing operation is performed on one print medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147566 filed Aug. 9, 2019, which is hereby incorporated by reference herein in its entirety.

What is claimed is:

1. An image processing device that performs image processing to generate image data to be supplied to a printing apparatus, the image processing device comprising:
 a plurality of image processing groups each of which includes a plurality of modules that perform predetermined image processing on pieces of divided image data obtained by dividing input image data and each of which outputs the pieces of image data processed in the respective modules via a predetermined one of the modules; and
 a processor configured to act as a plurality of units comprising:
 (1) an obtaining unit to which the plurality of image processing groups are connected in parallel and which obtains the pieces of image data processed and outputted from the image processing groups;
 (2) a detection unit which detects an error module not performing normal processing among the plurality of modules;
 (3) a control unit which sets a usable group that is usable for the image processing among the plurality of image processing groups based on a result detected by the detection unit and which causes the usable group to execute the image processing on the pieces of divided image data; and
 (4) an execution unit configured (a) to execute a control for a print medium feed executed at a first time interval in the case where the error module is detected and (b) to execute a control for the print medium feed executed at a second time interval shorter than the first time interval in the case where the error module is not detected,
 wherein the printing is executed to the print medium fed based on the image data which is processed by the image processing.

2. The image processing device according to claim 1, wherein the detection unit detects, as the error module, any module that is unable to communicate with the obtaining unit and that does not perform normal image processing in the plurality of image processing groups.

3. The image processing device according to claim 1, wherein the control unit determines, as the usable group, any image processing group, among the plurality of image processing groups, that includes at least one normal module capable of communicating with the obtaining unit and capable of performing normal image processing.

4. The image processing device according to claim 1, wherein each of the image processing groups is configured to include (a) a module connected to the obtaining unit and (b) at least one module connected in series to the module connected to the obtaining unit.

5. The image processing device according to claim 1, wherein the control unit (a) sets, as normal groups, image processing groups, among the plurality of image processing groups, each including only normal modules capable of communicating with the obtaining unit and capable of performing normal image processing and (b) causes the normal groups to execute image processing on the pieces of divided image data obtained by dividing the input image data into pieces numbering as many as the number of normal groups.

6. The image processing device according to claim 3, wherein the control unit (a) obtains a use amount of memories in the normal modules included in the usable group and (b) generates the pieces of divided image data by dividing the input image data into a certain number of pieces depending on the obtained use amount of the memories.

7. The image processing device according to claim 6, wherein in the case where the use amount of the memories exceeds a predetermined use amount, the control unit generates the pieces of divided image data by dividing the image input image data into pieces numbering as many as all of the image processing groups, and
 wherein in the case where the use amount of the memories does not exceed the predetermined use amount, the control unit generates the pieces of divided image data by dividing the input image data into pieces numbering as many as the normal groups.

8. The image processing device according to claim 5, wherein the control unit (a) selects a certain number of groups from the normal groups depending on a size of an image expressed by the input image data and causes the selected normal groups to execute image processing on the pieces of divided image data generated by dividing the input image data into pieces numbering as many as the number of selected normal groups.

9. The image processing device according to claim 1, wherein the control unit (a) sets at least one of the plurality of modules included in each of the image processing groups as a module to be used and sets another module as an unused module and (b) in the case where there is the error module in the module to be used, causes the unused module belonging to an image processing group different from the image processing group to which the error module belongs to execute the image processing for the error module.

10. The image processing device according to claim 1, wherein, in the case where at least the module connected to the obtaining unit is a normal module capable of performing normal image processing, the control unit determines, as the usable group, the group including the normal module.

11. The image processing device according to claim 3, wherein, in the case where the error module is present in the usable group, the image processing on the pieces of divided image data is executed only by the normal module in the usable group to which the error module belongs.

12. The image processing device according to claim 11, wherein the control unit determines a data amount of the piece of divided image data to be processed by the usable group including the error module such that image processing speed of the usable group including the error module is equal to the image processing speed of the usable group including only the normal modules.

13. The image processing device according to claim 1, wherein the plurality of modules included in each of the image processing groups execute image processing on a plurality of pieces of color component data included in the input image data, respectively.

14. The image processing device according to claim 1, wherein the control unit further comprises:
 a speed obtaining unit that obtains processing speed at which each of the image processing groups processes the pieces of divided image data; and a setting unit that sets a time interval of the feeding of the print medium based on the obtained processing speed.

15. The image processing device according to claim 1, wherein an image is formed on at least one of a plurality of transfer bodies included in a transfer cylinder based on the image data which is processed by the image processing,
wherein the image formed on the at least one of the plurality of transfer bodies is transferred to the fed print medium,
wherein in the case where a control which executes the print medium feed at the first time interval is performed, control is performed such that a first number of transfer bodies among the plurality of transfer bodies are used, and
wherein in the case where a control which executes the print medium feed at the second time interval is performed, control is performed such that a second number of transfer bodies among the plurality of transfer bodies are used, the second number being greater than the first number.

16. A printing apparatus comprising:
an image processing device that performs image processing to generate image data;
a printing unit which performs printing on a print medium based on image data subjected to image processing by the image processing device; and
a print control unit which controls the printing unit, the print control unit comprising a processor,
wherein the image processing device includes:
(A) a plurality of image processing groups each of which includes a plurality of modules that perform predetermined image processing on pieces of divided image data obtained by dividing input image data and each of which outputs the pieces of image data processed in the respective modules via a predetermined one of the modules; and
(B) a processor configured to act as a plurality of units comprising:
(1) an obtaining unit to which the plurality of image processing groups are connected in parallel and which obtains the pieces of image data processed and outputted from the image processing groups;
(2) a detection unit which detects an error module not performing normal processing among the plurality of modules;
(3) a control unit which sets a usable group that is usable for the image processing among the plurality of image processing groups based on a result detected by the detection unit and which causes the usable group to execute the image processing on the pieces of divided image data; and (4) an execution unit configured (a) to execute a control for a print medium feed executed at a first time interval in the case where the error module is detected and (b) to execute a control for the print medium feed executed at a second time interval shorter than the first time interval in the case where the error module is not detected,
wherein the printing is executed to the print medium fed based on the image data which is processed by the image processing.

17. The printing apparatus according to claim 16, wherein the print control unit (a) obtains the processing speed at which each of the image processing groups processes the pieces of divided image data and (b) controls a printing speed of the printing unit depending on the processing speed obtained.

18. An image processing method of performing image processing to generate image data to be supplied to a printing apparatus, the image processing method being a method for an image processing device, the image processing device including (a) a plurality of image processing groups each of which includes a plurality of modules that perform predetermined image processing on pieces of divided image data obtained by dividing input image data and each of which outputs the pieces of image data processed in the respective modules via a predetermined one of the modules and (b) a processor configured to act as an obtaining unit to which the plurality of image processing groups are connected in parallel and which obtains the pieces of image data processed and outputted from the image processing groups, the image processing method comprising:
a detecting step of detecting an error module not performing normal processing among the plurality of modules;
a setting step of setting a usable group that is usable for the image processing among the plurality of image processing groups based on a result detected in the detecting step;
a control step of causing the usable group to execute the image processing on the pieces of divided image data; and
an execution step of (a) executing a control for a print medium feed executed at a first time interval in the case where the error module is detected and (b) executing a control for the print medium feed executed at a second time interval shorter than the first time interval in the case where the error module is not detected,
wherein the printing is executed to the print medium fed based on the image data which is processed by the image processing.

* * * * *